US006735583B1

(12) United States Patent
Bjarnestam et al.

(10) Patent No.: US 6,735,583 B1
(45) Date of Patent: May 11, 2004

(54) METHOD AND SYSTEM FOR CLASSIFYING AND LOCATING MEDIA CONTENT

(75) Inventors: Anna Bjarnestam, Seattle, WA (US); Karina Holm, London (GB); Alan Capel, Buckinghamshire (GB); William G. Kuhn, Seattle, WA (US); Jason Staczek, Seattle, WA (US)

(73) Assignee: Getty Images, Inc., Seattle, WA (US)

(*) Notice: Subject to any disclaimer, the term of this patent is extended or adjusted under 35 U.S.C. 154(b) by 462 days.

(21) Appl. No.: 09/705,513

(22) Filed: Nov. 1, 2000

(51) Int. Cl.[7] .............................................. G06F 17/30
(52) U.S. Cl. .................................. 707/2; 707/4; 707/5
(58) Field of Search ...................... 707/1–10, 100–104.1

(56) References Cited

U.S. PATENT DOCUMENTS

| | | | | |
|---|---|---|---|---|
| 4,829,453 A | * | 5/1989 | Katsuta et al. | 382/305 |
| 4,907,188 A | | 3/1990 | Suzuki et al. | 364/900 |
| 5,220,648 A | | 6/1993 | Sato | 395/146 |
| 5,404,507 A | | 4/1995 | Bohm et al. | 395/600 |
| 5,553,277 A | * | 9/1996 | Hirano et al. | 707/104.1 |
| 5,761,655 A | | 6/1998 | Hoffman | 707/4 |
| 5,802,361 A | | 9/1998 | Wang et al. | 395/600 |
| 5,963,940 A | * | 10/1999 | Liddy et al. | 707/5 |
| 5,978,804 A | * | 11/1999 | Dietzman | 707/10 |
| 6,311,194 B1 | * | 10/2001 | Sheth et al. | 715/505 |
| 6,442,545 B1 | * | 8/2002 | Feldman et al. | 707/6 |
| 6,484,166 B1 | * | 11/2002 | Maynard | 707/5 |
| 6,496,830 B1 | * | 12/2002 | Jenkins, Jr. | 707/100 |
| 6,662,192 B1 | * | 12/2003 | Rebane | 707/104.1 |

OTHER PUBLICATIONS

Bjarnestam, "Description of an Image Retrieval System for Contemporary Imagery," *Challenge of Image Retrieval 1998 Conference*, Newcastle, United Kingdom, pp. 1–3, Feb. 5, 1998.

* cited by examiner

Primary Examiner—Greta Robinson
Assistant Examiner—Linh Black
(74) Attorney, Agent, or Firm—Seed IP Law Group PLLC

(57) ABSTRACT

A computer-based method and system for classifying and locating media content is provided. In preferred embodiments, a dynamically modifiable, structured vocabulary system is used to drive a media classification and search system. An exemplary embodiment of the media classification and search system includes media content unit classification services, a media content unit search engine, and one or more data repositories, including typically a media content unit collection, metadata, the vocabulary, and a term-to-media content reverse index. The structured vocabulary provides a classification system, whose structure and relationships can be altered independently of the media content being classified, thus enabling tuning of the system without needing to reclassify data. The use of the structured vocabulary also increases the rate of success and efficiency in matching search requests to locate media content.

114 Claims, 15 Drawing Sheets

Which 'bow' do you mean?

☐ "Bow:Knot"

☐ "Bow:Bow and Arrow"

☐ "Ship's Bow:Vehicle Part"

☐ "Bowing:Moving Activity"

☐ "Bow:Violin Family"

*Fig. 14*

METHOD AND SYSTEM FOR CLASSIFYING AND LOCATING MEDIA CONTENT

TECHNICAL FIELD

The present invention relates to classifying and locating media and, in particular, to computer software that classifies and locates media content units using a structured vocabulary.

BACKGROUND OF THE INVENTION

With the advent of larger storage capacities, computer systems have become more frequently used for storing huge collections of data, such as collections of multimedia files stored, for example, on multi-gigabyte disk drives. The larger and more diverse the data collection, the more difficult it becomes to deterministically retrieve a particular requested item in an efficient manner. A user is typically presented with a search request dialog, which requests the user supply a search request containing one or more words, optionally connected by Boolean expressions. Sometimes, keyword-value pairs are used to further clarify the search. For example, a user might search a set of files for all files containing the words "video" and "device driver," where the "author" field equals "Hemingway."

Various search and retrieval techniques have been employed to make the search and retrieval process more deterministic or efficient. For example, in the field of document retrieval, a vocabulary for describing documents has been employed, typically according to characteristics of the language itself. Such a system operates much like an index of a book. For example, a description language is derived based upon the frequency of occurrence of various words in the language and the juxtaposition statistics of these words (i.e., which words tend to appear together). This description language is then used to group various documents and to later retrieve them.

As another example, a system that maintains collections of clipart images may use an arbitrary set of words to characterize each image in the collection. When a user subsequently requests the retrieval of images, the user guesses at what terms were used in the classification process, or is instead presented with a fixed list, such as a list of categories. For example, a user might request the system to locate all images having to do with "balloons." The success of the search is directly dependent upon how many and which images had been associated by the system with the word "balloon." Since the choice of the words used by the system to characterize the images is arbitrary, the user's rate of success at picking the same words to describe the same images is somewhat random.

Other variations include using a caption or English sentence to describe an image. These techniques handle images in a similar manner to the document retrieval mechanisms. One difficulty with these techniques is that the captions are rarely well-formed sentences, and document retrieval system techniques are typically based upon tuning parameters that apply to well-formed sentences (e.g., frequency and juxtaposition).

Several image evaluation systems have employed recognition-based techniques for describing or classifying images. Some of these systems have used computational analysis of the colors, edges, shapes, and textures of the stored images to derive the subject matter of the image. For example, from a description of the shape of an object, a "stick-figure" model is constructed, which is then compared to objects in target images. Because different objects may reduce to similar stick figures, e.g., a pile of sticks and an actual picture of a horse may result in similar stick figures, these systems are prone to error. Also, stick-figure models typically do not contain sufficient detail to distinguish between objects with slight variation, e.g., an oak tree versus an elm tree. In addition, these recognition-based systems are computationally intensive.

SUMMARY OF THE INVENTION

Embodiments of the present invention provide methods and systems for creating and maintaining a dynamically modifiable hierarchical vocabulary system that is used to classify and locate desired units of media content in a deterministic and efficient manner. Exemplary embodiments include a structured vocabulary-driven media classification and search system (an "MCSS"). The MCSS is connected through a communications medium to one or more computer systems that provide, locate, request, and/or receive media content units. The MCSS creates and maintains a structured vocabulary representation, associates media content units with terms from the structured vocabulary, stores data to maintain those associations, and locates media content units upon request when a term previously associated with the media content units is submitted as search criteria.

The media classification and search system includes media content unit classification services, a search engine, and several data repositories. The data repositories store the media content units, the structured vocabulary, metadata associated with the content, which includes terms from the structured vocabulary that are used to characterize each media content unit, and a reverse index from the characterization terms that are stored in the metadata to the media content units associated with those terms.

In one embodiment, the structured vocabulary is stored as a hierarchical data structure of vocabulary units, where each unit represents a term and its relationship to other terms. Each vocabulary unit preferably contains a term identifier, which is independent of the value of the term, which can be used to uniquely refer to that vocabulary unit. Preferably, a first term that is subordinate to a second term indicates that the first term is a more specific classification or characterization of the second term. In one embodiment, the first term is a species of the genus characterized by the second term.

In yet another embodiment, further classifications and alterations of the vocabulary preferably can be performed without effecting media content that has been already classified using vocabulary terms. This enables the vocabulary to be refined over time without reprocessing or reclassifying the media content.

In another embodiment, each vocabulary unit represents a term in a default language and equivalent terms in one or more other languages, whose meaning is similar to the term in the default language. In addition, each term in each language is further associated with a list of synonym terms which, for classification purposes, are considered to have similar or the same meaning. Synonym terms may also be used to handle input errors. That is, common typographical errors that might occur in generating search criteria for a particular vocabulary term can be stored in a synonym list of the vocabulary unit that corresponds to that term, thus allowing the search engine to "recognize" the misspelling.

In one embodiment, media content units can be located using terms from the structured vocabulary in a different language than the language originally used to classify those media content units.

In another embodiment, terms can be translated to different languages to enhance the structured vocabulary without effecting the media content units already classified using the structured vocabulary.

In one embodiment, the search engine aids in the process of disambiguating terms, where a particular term in a search request matches several different terms in the structured vocabulary. Typically, this situation occurs when a particular term has more than one meaning. In one embodiment, the search engine presents a set of options for the requester to choose between. In another embodiment, the search engine presents all of the possible meanings for the term. In yet another embodiment, the disambiguating process can be enabled and disabled.

BRIEF DESCRIPTION OF THE DRAWINGS

FIG. 14 is an example screen display of a dialog used to disambiguate search terms.

DETAILED DESCRIPTION OF THE INVENTION

Figure 1:
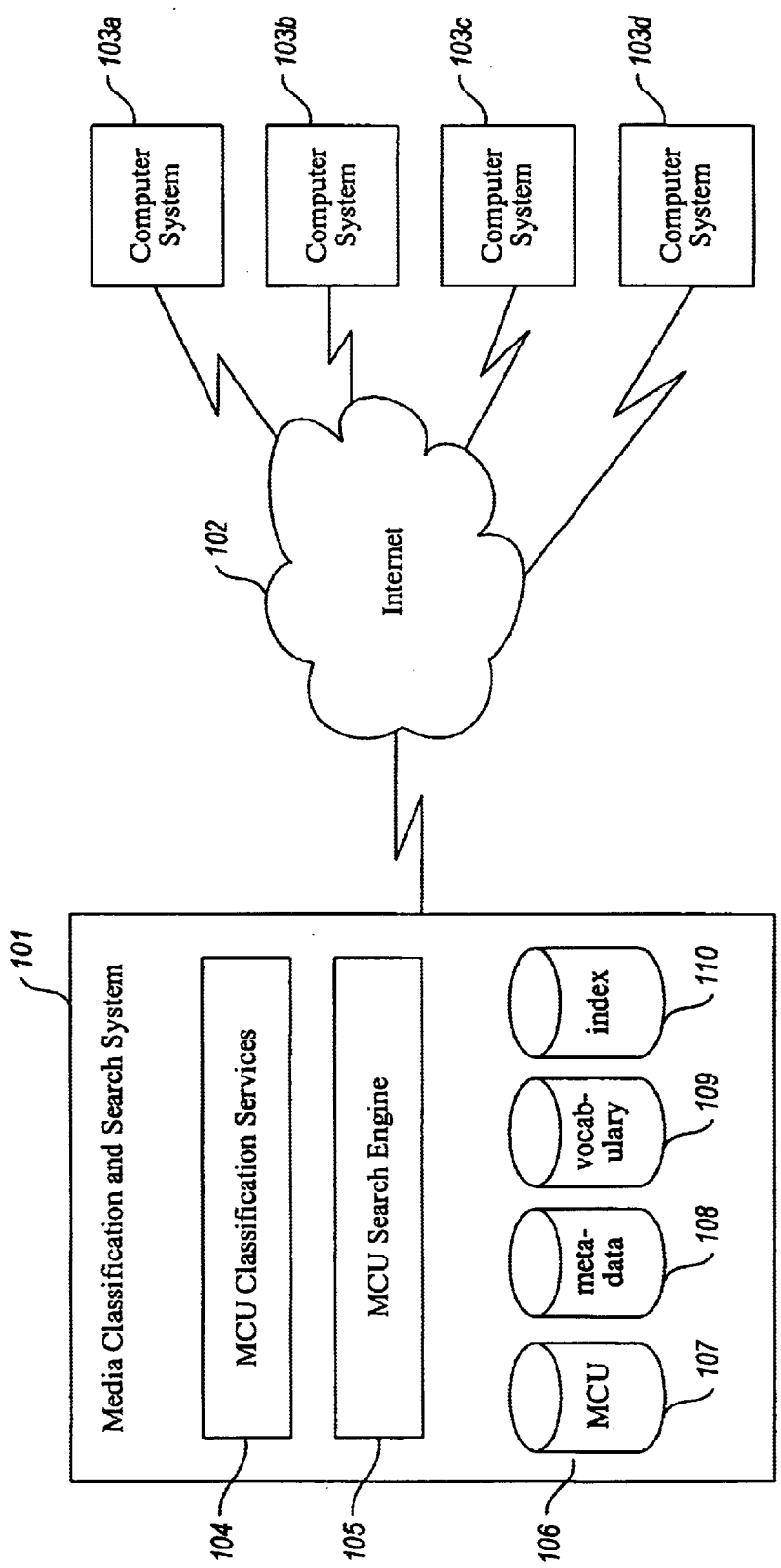
FIG. 1 is a block diagram of an example media classification and search system driven by a structured vocabulary.

Embodiments of the present invention provide methods and systems for creating and maintaining a dynamically modifiable, hierarchical vocabulary system that is used to classify and locate desired units of media content in a deterministic and efficient manner. A media content unit (MCU) is a resource that can be electronically stored and that contains a type of image, sound, text, etc., relating to entities such as photographic pictures, paintings, motion pictures, animation, videos, sound and audio recordings, literature, etc. One skilled in the art will recognize that actors, artists, composers, and authors use various forms of media, including forms of media not directly mentioned above, to create works of authorship. The term "media content unit" is intended to encompass works manifested in various media, including works of authorship and media not specifically mentioned.

Exemplary embodiments include a vocabulary-driven media classification and search system (an "MCSS"). The MCSS is connected through a communications medium to one or more computer systems that provide, locate, request, and/or receive media content units. The computer systems also preferably assist in classifying potential search terms into a structured vocabulary and arranging them in a structured vocabulary data repository so that the terms may be used subsequently to classify and locate particular kinds of media content units. One skilled in the art will recognize that the word "term" can include a phrase of one or more descriptive terms. A structured vocabulary is a set of terms organized according to their relationships to each other, so that a relationship between two terms is typically inherent in the organization of the terms. For example, a hierarchical arrangement of terms implies that a "child" term (of a lesser level) is subordinate in some manner to its "parent" term. In embodiments of the present invention, the structured vocabulary is preferably arranged as a hierarchy, which defines a taxonomy of terms, where each level provides more specificity of description. For example, the highest (root) level might group all terms into "living" and "non-living" things. The next level might describe "living" things as either "plants" or "animals."

The structured vocabulary of the present invention is logically represented as a tree with multiple disparate nodes at the root, each root node representing a possible entry point for a search of media content. As the depth and breadth of the tree increases, terms of increasing specificity are defined. Associating a media content unit with a term from a particular node implicitly associates all parent nodes of the particular node to that media content unit as well. Thus, a media content unit can be classified by a series of terms, progressively more specific, as deeper nodes in the structure are traversed. The structured vocabulary therefore provides a taxonomy of descriptive terms, which can be used to classify and retrieve various types of media content, including images. Once the structured vocabulary is defined, it can be stored in a data repository and used to drive the media classification and searching system.

One of the advantages of using a structured vocabulary to drive a media classification and retrieval system is that it provides a method for dynamically modifying the structures and relationships of the classification system without invalidating the classifications of objects already performed. Embodiments of the present invention allow new terms to be added, existing terms to be modified, and relationships among the terms to be changed, for example, by splitting a sub-tree into smaller components so that the collection of MCUs classified by each component is reduced. This is particularly beneficial in instances where the population of media content is large or where it can be supplemented outside of the control or knowledge of the system. Modifications to the classification system, i.e., the structured vocabulary, are desirable because, as the collection of MCUs grows, the media classification and search system can incorporate more knowledge about how terms can be used to best describe the media content. This knowledge is typically dependent upon the types and number of media content units classified, as well as the type of search requests that are processed.

FIG. 1 is a block diagram of an example media classification and search system driven by a structured vocabulary. The MCSS 101 is connected to a communication medium, for example, the Internet 102, which is in turn connected to one or more computer systems 103. The MCSS 101 has Media Content Unit Classification Services 104, an Media Content Unit Search Engine 105, and one or more data repositories 106. For example, the data repositories 106 may include a Media Content Unit Collection 107, the Metadata Collection 108, the Structured Vocabulary 109, and the Term-to-MCU Index 110. The Media Content Unit Classification Services 104 provides routines to classify MCUs stored in the Media Content Unit Collection 107 by associating each MCU with terms from the Structured Vocabulary data repository 109. These associations are then stored in the Metadata Collection 107. Once the MCUs have been classified, a Term-to-MCU Index 110 is generated, which describes what MCUs have been associated with each term. The Media Content Unit Search Engine 105 provides routines that, in response to a search request, locate and retrieve a collection of MCUs from the Media Content Unit Collection 107 using the Structured Vocabulary data repository 109 and the Term-to-MCU Index 110.

Figure 2:
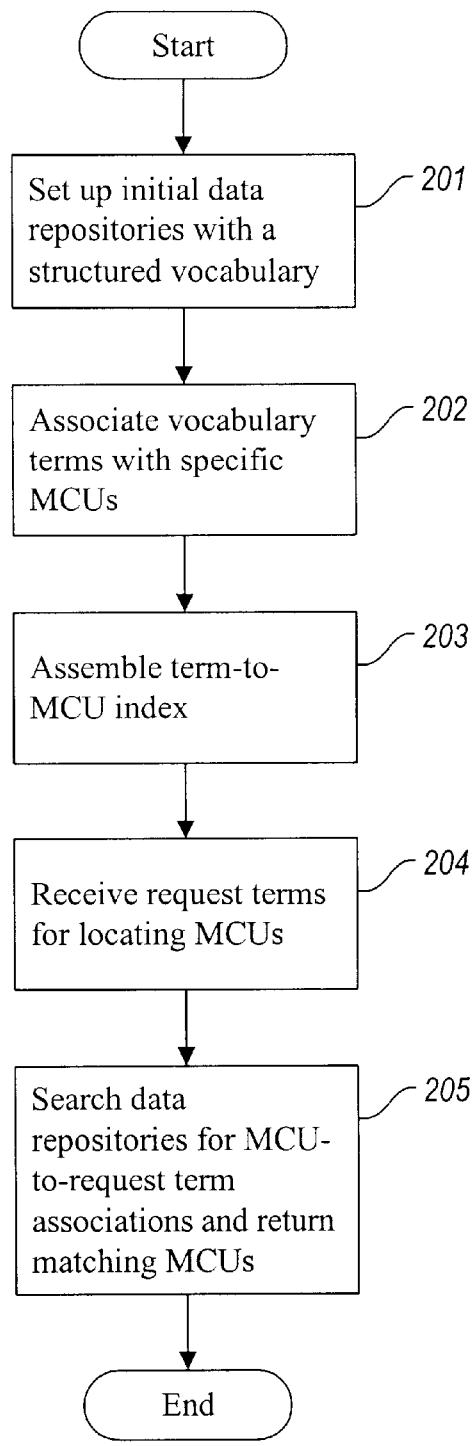
FIG. 2 is an overview process diagram of the steps performed by an example media classification and search system.

FIG. 2 is an overview process diagram of the steps performed by an example media classification and search system. Steps 201 through 205 demonstrate how the Structured Vocabulary data repository 109 and Metadata Collection 108 are formed and used to create the Term-to-MCU Index 110, which is used to locate particular media content units from Media Content Unit Collection 107 according to descriptive terms. Specifically, in step 201, an initial structured vocabulary is created, which classifies terms according to a hierarchy as described above and stores them in Structured Vocabulary data repository 109. As will be discussed with reference to FIG. 3, vocabulary units within the Structured Vocabulary data repository 109 are arranged in a tree or n-plex structure with subordinated vocabulary units being logical subsets of the vocabulary units to which they are subordinated. (A vocabulary unit is roughly speaking a representation of a logical node in a vocabulary tree.) In step 202, vocabulary units are used to classify MCUs by associating them with specific media content units. It is important to note that steps 201 and 202 are independent of each other. They may be executed repeatedly and concurrently, as changes to the structured vocabulary are desired. For example, as terms derived from media content units are added to the vocabulary, they may then be used to "fine-tune" the structured vocabulary for greater efficiency. These associations are stored in the metadata units of the Metadata Collection 108. As will be discussed with reference to FIG. 6, each metadata unit contains a list of one or more term identifiers that describe characteristics of a particular media content unit. Term identifiers are used instead of the terms themselves to preserve language independence. In step 203, the Term-to-MCU Index 110 is assembled, which allows media content units to be located through the term identifiers contained in the Index 110. Thus, the Index 110 serves as a "reverse" index of MCUs, arranged by search terms. In step 204, a request for a list of MCUs that match a particular search criteria (search terms) is received by the MCSS. In step 205, the MCU Search Engine 105 normalizes the received search terms to determine term identifiers and locates media content units that are referred to by these term identifiers and by their subordinate term identifiers according to their ranking in the vocabulary. The located media content units are optionally displayed, for example, in a list or as electronic representations of the located media content units.

Figure 3:
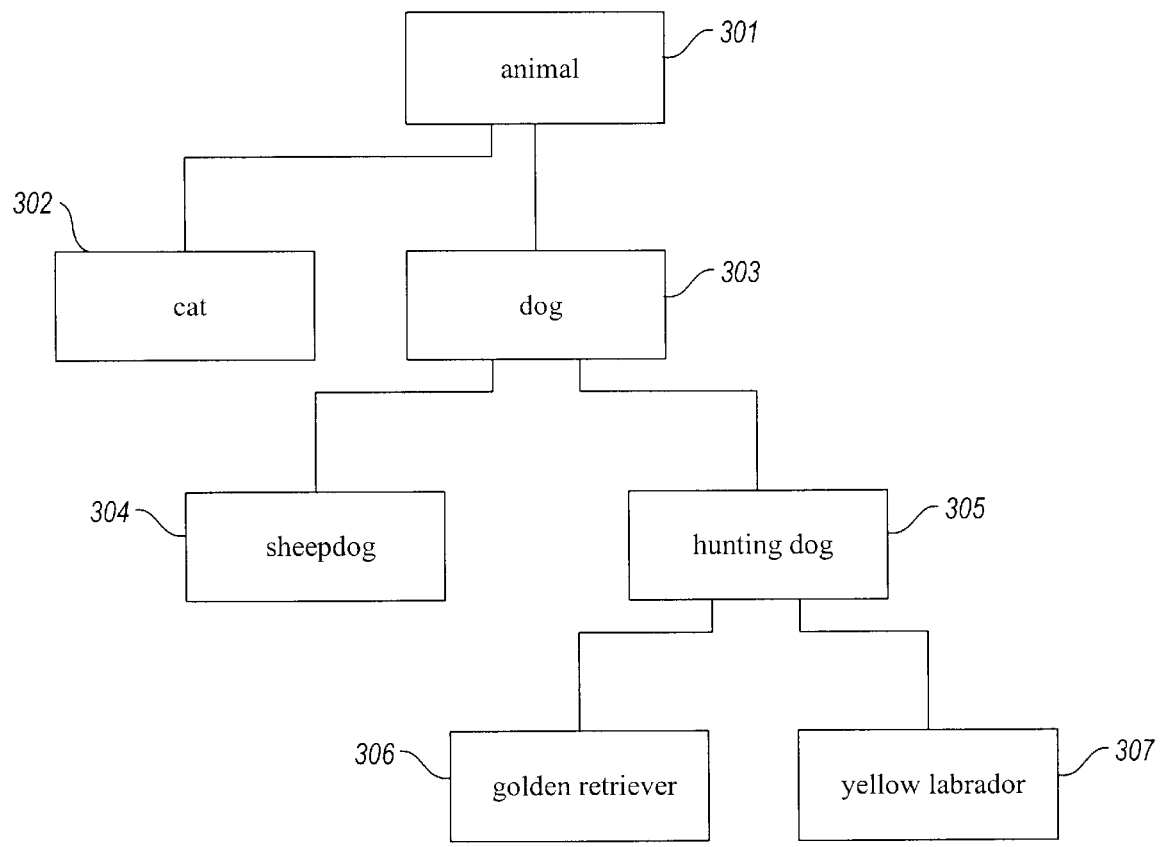
FIG. 3 is a schematic of an example portion of a structured vocabulary stored in a data repository.

FIG. 3 is a schematic of an example portion of a structured vocabulary stored in a data repository. In order to create a vocabulary-driven media classification and search system, an initial structured vocabulary must be created and stored (step 201 of FIG. 2). The vocabulary units of the vocabulary data repository are arranged logically so that vocabulary units containing terms that are logical subsets of certain vocabulary units containing broader terms are subordinated to those vocabulary units that contain the broader terms. For example, vocabulary unit 301 contains the term "animal." Because the term "cat" in vocabulary unit 302 and the term "dog" in vocabulary unit 303 are logical subsets of the broader term "animal," vocabulary unit 302 and vocabulary unit 303 both are subordinated to vocabulary unit 301, which contains the term "animal." In a similar fashion, vocabulary unit 304 and vocabulary unit 305 are subordinated to vocabulary unit 303 because "sheepdog" and "hunting dog" are both logical subsets (i.e., specific categories) of the broader term "dog," which is contained in vocabulary unit 303. Likewise, vocabulary units 306 and 307 both are subordinated to vocabulary unit 305, because "golden retriever" and "yellow labrador" are both kinds of "hunting dog." One skilled in the art will recognize that this type of classification system may be applied to most, if not all, terms used to describe media content units. The terms arranged in the hierarchy may lend themselves to an objective classification, as in the preceding example, or the terms may lend themselves to a more subjective classification, such as emotions, themes, etc., which require greater human judgment. It will also be apparent to one skilled in the art that a vocabulary unit may be subordinated to one or more other vocabulary units. For example, the term "skip" may be subordinated to both the term "run" and the term "jump." In typical embodiments, each vocabulary unit may contain terms in other languages that are largely equivalent to the corresponding terms of the default language. A single, verifying term identifier is preferably used to refer to the entire vocabulary unit to represent the relationship of that term to other terms in a language-independent fashion.

Figure 4:
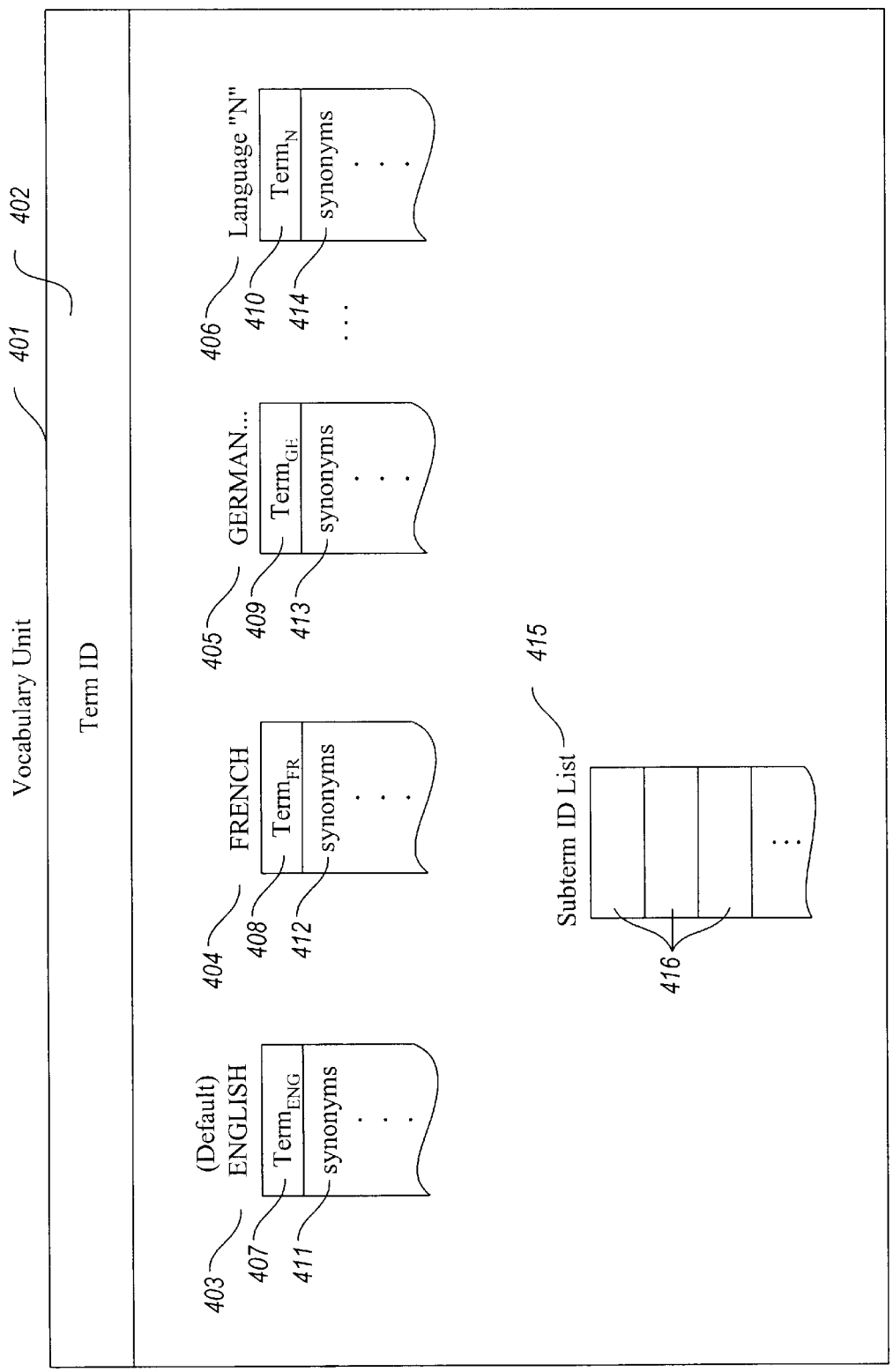
FIG. 4 is an example diagram of a vocabulary unit of a structured vocabulary data repository.

FIG. 4 is an example diagram of a vocabulary unit of a structured vocabulary data repository. Vocabulary unit 401 comprises term identifier 402, which contains a preferred term (value) in a default language, a synonym list 403 (in the default language), and a subterm identifiers list 415. Vocabulary unit 401 may optionally contain additional synonym lists 404, 405, 406 in various other languages.

The term identifier 402 is a unique identifier used to designate a particular vocabulary unit 401. The term identifier 402 should not be the descriptive term itself, because ambiguous terms may be present in some languages, and thus cannot be used to uniquely identify an object. Using a unique identifier, instead of a word in a given language, allows for language-neutral structure in the vocabulary, which facilitates handling search requests from a variety of differing languages.

The vocabulary unit 401 also comprises one or more synonym lists, one representing a default language (e.g., English), and other synonym lists representing other languages. One use of the synonym list is to represent varying ways in which a concept may be expressed in a search request. Common misspellings of words may also be included in the synonym list, which allows misspelled requests to be processed despite the presence of an error. In an example embodiment, default synonym list 403 contains English terms, synonym list 404 contains French terms, synonym list 405 contains German terms, and synonym list 406 contains terms in an arbitrary language. A synonym list (e.g., synonym list 403) is comprised of a preferred term 407 and a list 411 of zero or more terms that share the same (or a close) meaning as the preferred term 407. The synonym list of each language forms a sub-vocabulary of the structured vocabulary. Accordingly, the synonym list of each language allows a requestor access to the Media Content Unit Collection in the requestor's own language. Also, a requester may request and access MCUs in a language other than the original language used to classify the MCU without detrimental effect.

When the vocabulary unit 401 is a parent vocabulary unit, it also contains a subterm identifiers list 415, which is a list of the child vocabulary units that are directly subordinated to it (child nodes in the "tree" structure). For example, using the example vocabulary of FIG. 3, if the vocabulary unit 401 contains a preferred term 407 of "dog," then the subterm identifiers list 415 would contain the term identifiers that correspond to the child vocabulary units whose preferred terms contain "sheepdog" and "hunting dog."

Figure 5:
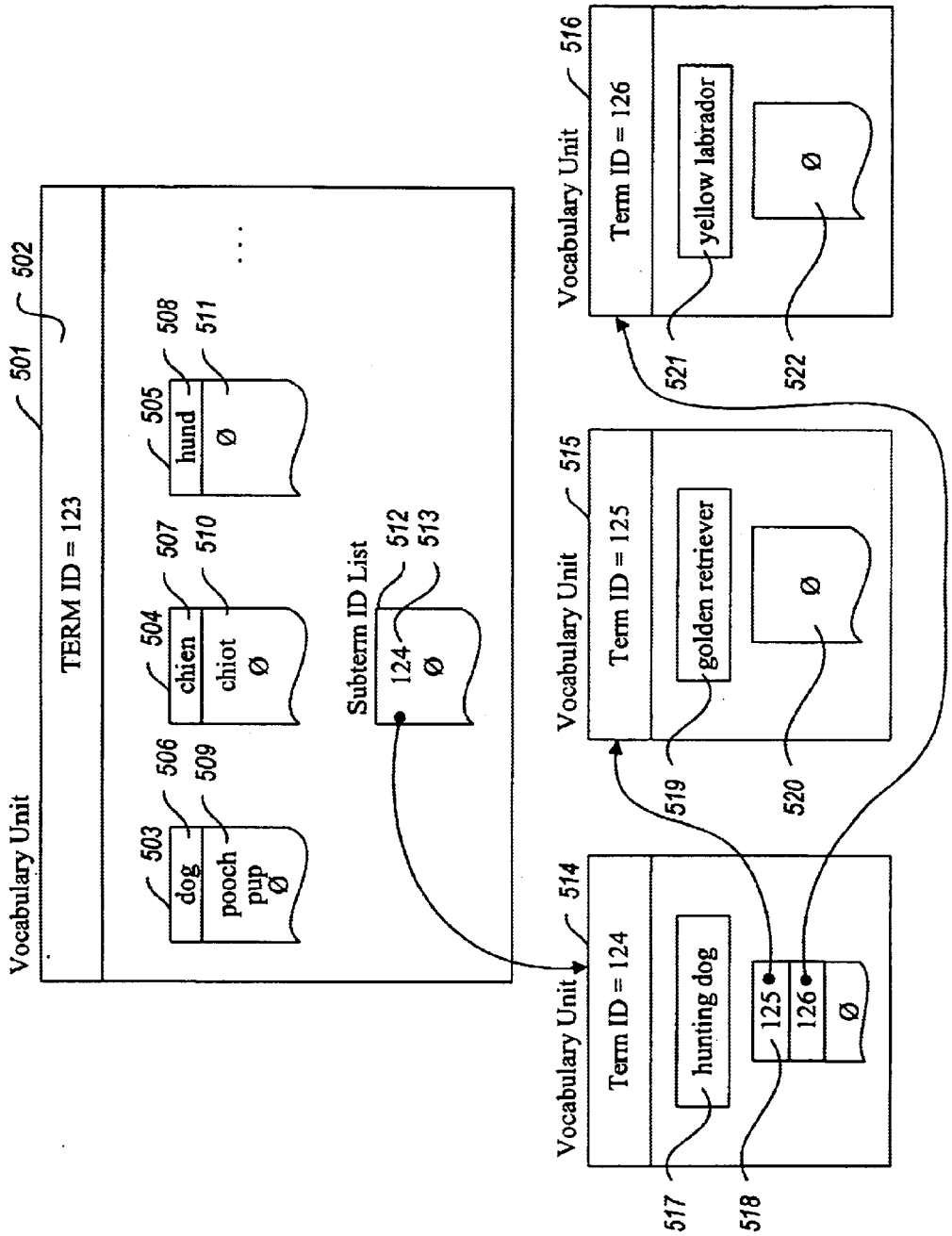
FIG. 5 is an example diagram of the structure and relationship of example vocabulary units.

FIG. 5 is an example diagram of the structure and relationship of example vocabulary units. FIG. 5 illustrates an example vocabulary that supports the English, French, and German languages. In this example, the English terms "golden retriever" and "yellow labrador" are subordinated to "hunting dog," which in turn is subordinated to the broader class of "dog," as discussed with reference to FIG. 3. Vocabulary unit 501 comprises a term identifier 502 with a value of "123," which uniquely identifies the vocabulary unit 501 and contains synonym lists 503, 504, and 505 in English, French, and German, respectively. English synonym list 503 contains the preferred term 506 of "dog" and synonymous terms 509 of "pooch" and "pup." The French synonym list 504 contains the preferred term 507 of "chien" and the synonymous term 510 of "chiot." The German synonym list 505 contains the preferred term 508 of "hund" and no synonymous terms 511. In this example (and consistent with the vocabulary shown in FIG. 3), the parent vocabulary unit 501 that corresponds to "dog" has only one child vocabulary unit 514, which corresponds to "hunting dog." Accordingly, subterm identifier list 512 of parent vocabulary unit 501 contains only one term identifier 513, which is the term identifier of vocabulary unit 514. Vocabulary unit 514 has a preferred term 517 of "hunting dog" in its English synonym list and a subterm identifier list 518. The subterm identifier list 518 contains term identifiers with values of "125" and "126," which are the term identifiers of vocabulary units 515 and 516 respectively. Vocabulary unit 515 has a preferred term 519 of "golden retriever" and vocabulary unit 516 has a preferred term of 521 of "yellow labrador." Vocabulary unit 515 and 516 do not have any child vocabulary units (they are shown as leaf nodes in FIG. 3), and thus their subterm identifier lists 520 and 522 contain a null value as a terminal identifier.

Figure 6:
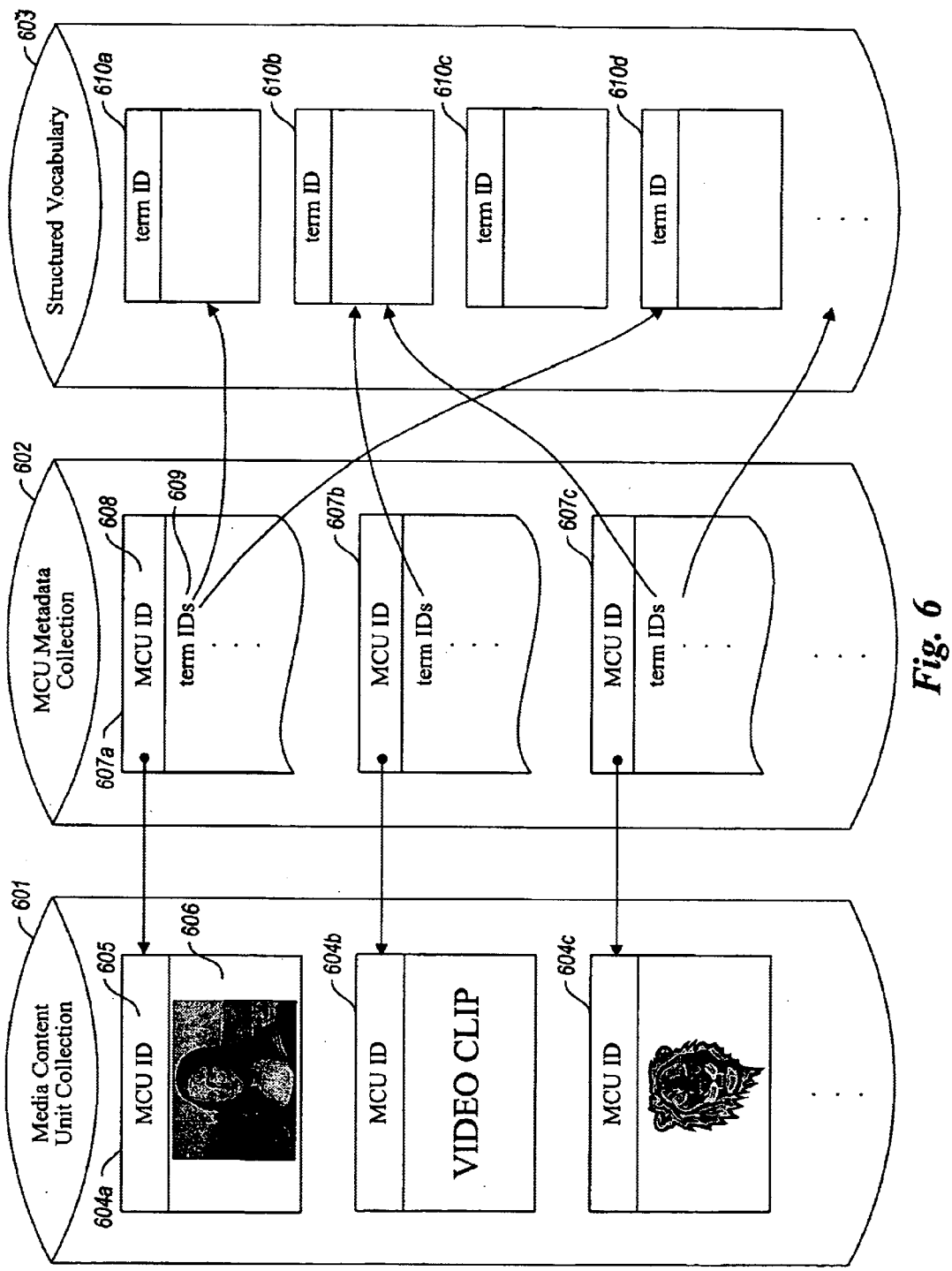
FIG. 6 is an example diagram demonstrating the MCU metadata collection and its relationship to other data repositories used by the media classification services.

After the initial data repositories for the structured vocabulary have been set up (step 201 of FIG. 2), a metadata collection is formed that associates descriptive terms from the vocabulary units to existing media content units (step 202 of FIG. 2). FIG. 6 is an example diagram demonstrating the MCU metadata collection and its relationship to other data repositories used by the media classification services. For example, FIG. 6 shows the relationship of MCU metadata collection 602 to the collections of media content units 601 and the vocabulary data repository 603. The media content collection 601 is a data repository of media content units 604, which each contain a media content unit identifier 605 and a media content unit 606. As discussed above, a media content unit is a potentially stored resource such as an image, motion picture, audio and sound recording, etc. The MCU metadata collection 602 is a data repository of MCU metadata units 607, which each contain an MCU identifier 608, which uniquely associates a metadata unit 607 with a particular media content unit 604. The metadata for each particular media content unit 604 may also optionally contain additional information such as originating artist, title and caption, size, date, and format. The metadata unit 607 also contains a list of term identifiers 609, each of which point to a particular vocabulary unit 610. Thus, each metadata unit contains a list of terms from the structured vocabulary that describe a particular media content unit.

Figure 7:
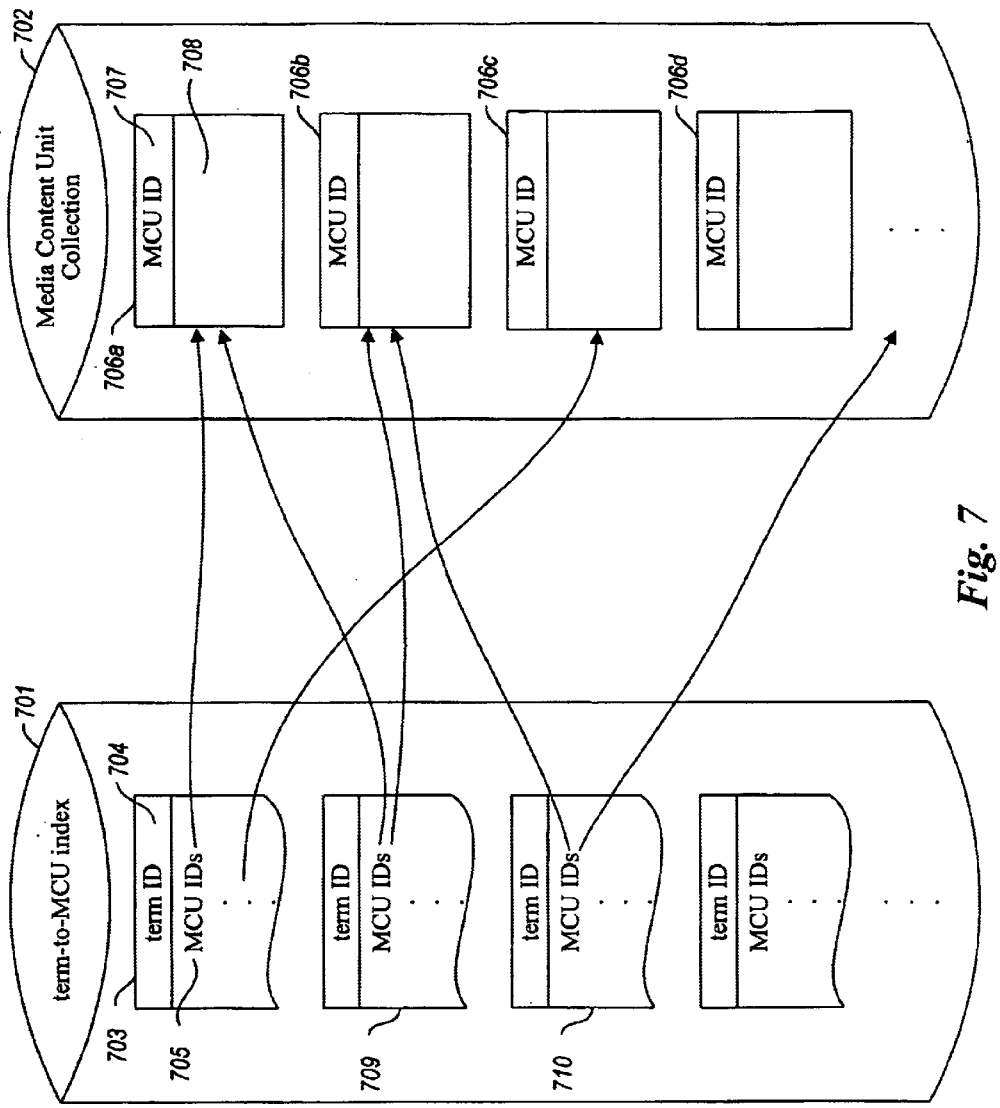
FIG. 7 is an example diagram of the relationship of a term-to-MCU index to a Media Content Unit Collection.

After the media content units have been classified (step 202 of FIG. 2), a special index is created to allow for efficient searching of media content units that are described by particular terms (step 203 of FIG. 2). FIG. 7 is an example diagram of the relationship of a term-to-MCU index to a Media Content Unit Collection. The term-to-MCU index 701 is used to rapidly locate specific kinds of media content units by providing a list of all of the media content units that have been associated with a specific term to that point in time. The term-to-MCU index 701 is assembled by creating a "reverse-index" of the metadata collection (602 in FIG. 6). The reverse-index is created in an example embodiment by creating a list of all of the term identifiers 609 stored in the MCU metadata collection 602 and associating each term identifier in the list with all of the media content units that were associated with the term identifier in the MCU metadata collection 602.

Specifically, the term-to-MCU index 701 contains a list of reverse-index units 703, each of which contains a term identifier 704 and a list of media content unit identifiers 705. The term identifier 704 is used to describe a particular characteristic that pertains to each and every one of the media content unit identifiers 705 referred to by the reverse-index unit 703. In FIG. 7, the media content unit identifiers 705 refer to various media content units 706 within the media content unit collection 702. Note that a particular media content unit 706 may have more than one reverse-index unit 703 that refers to the particular media content unit 706. For example, reverse-index units 709 and 710 both refer to media content unit 720.

Figure 8:
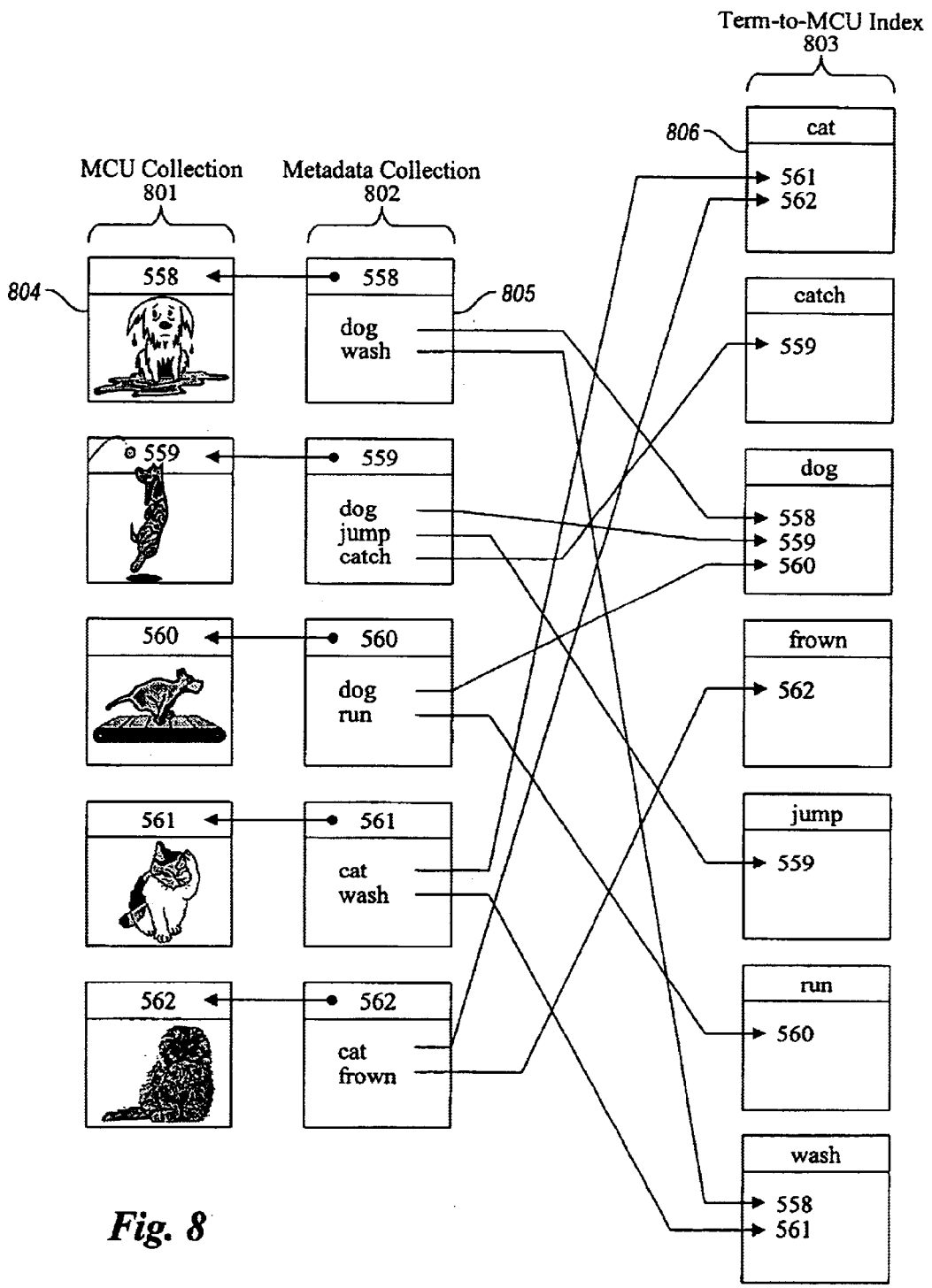
FIG. 8 is an example diagram of the formation of a sample term-to-MCU index.

FIG. 8 is an example diagram of the formation of a sample term-to-MCU index. MCU collection 801 is shown with metadata collection 802, which has metadata units that refer to particular media content units 804 within the Media Content Unit collection 801. Each metadata unit 805 contains terms (via term identifiers) that describe the media content unit to which it refers. Each such term in metadata collection unit is used to form a reverse-index unit 806 in term-to-MCU index 803. For example, because the term "cat" appears in the metadata units 805 having MCU identifiers of "561" and "562," a reverse-index unit 806 is created that has a term identifier that refers to "cat" and stores the MCU identifiers of "561" and "562." Likewise, because the term "catch" appears in the metadata unit having MCU identifier of "559," a reverse-index unit 806 is created that has a term identifier that refers to "catch" and stores the MCU identifier "559." In similar fashion, each of the remaining terms shown in FIG. 8 in the metadata collection 802 is used to create a reverse-index unit in the term-to-MCU index 803 so that each term is referred to only once as an entry in the reverse index. If the term has been associated with more than one media content unit, the MCU identifiers of all of the associated media content units are appended to a single reverse-index unit.

After the term-to-MCU index has been created (step 203 of FIG. 2), the media classification and search system is ready to process search requests (step 204 of FIG. 2) and search for the requested media content units (step in 205 of FIG. 2). Each search request is normalized, as described below with reference to FIG. 13, to make the form of the search terms more likely to equate to the form used for the terms stored in the structured vocabulary data repository. After the search request has been normalized, the MCSS uses the normalized terms to locate the media content units that match the request.

Figure 9:
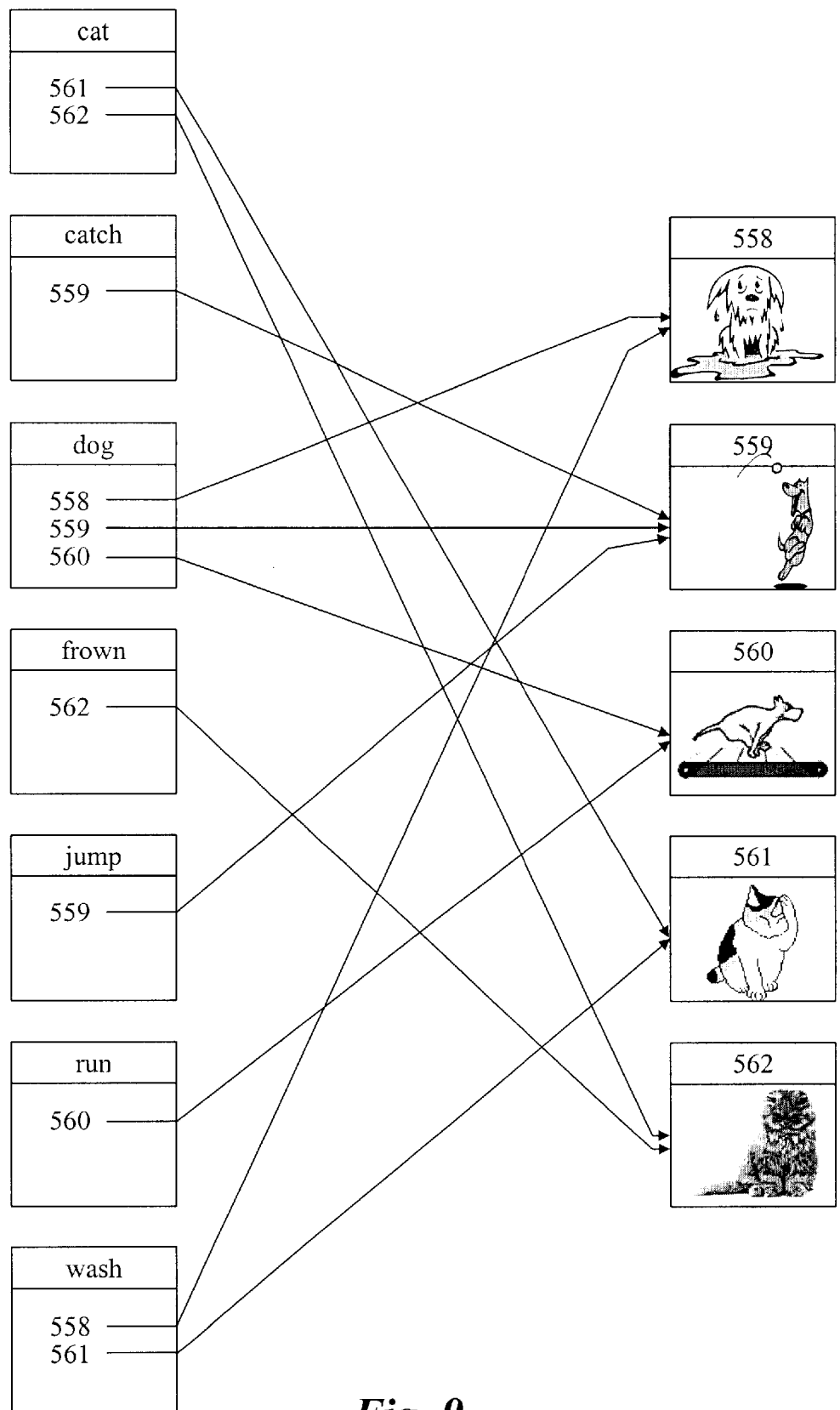
FIG. 9 is an example diagram that demonstrates how the term-to-MCU index is used to rapidly locate desired media content units.

FIG. 9 is an example diagram that demonstrates how the term-to-MCU index is used to rapidly locate desired media content units. In an example embodiment, the reverse-index units have been sorted alphabetically. It will be apparent to those skilled in the art that other structures and methods of arrangement of the index may be used to facilitate rapid searches. If, for example, the search term "DOG'S" is entered, the term would be normalized to "dog" and used to search the term-to-MCU index for a reverse-index unit containing the term "dog." When the reverse-index unit containing the term "dog" is located, the list of media content units to which the term "dog" pertains (MCU identifiers "558", "559," and "560") is immediately available to present. Without a term-to-MCU index, the entire metadata collection would have to be searched for the requested terms for every search request. Such an approach would be inefficient and time-consuming, especially for very large media collections.

In exemplary embodiments, the methods and system of the present invention are implemented on a computer system comprising a central processing unit, a display, a memory, and other input/output devices. Exemplary embodiments are designed to operate in a stand-alone or in a globally networked environment, such as a computer system that is connected to the Internet. Exemplary embodiments are also designed to operate in an environment that supports a graphical user interface, such as the graphical user interface support provided by various versions of the Windows operating system. One skilled in the art will recognize that embodiments of the MCSS can be practiced in other environments that support a graphical user interface.

Figure 10:
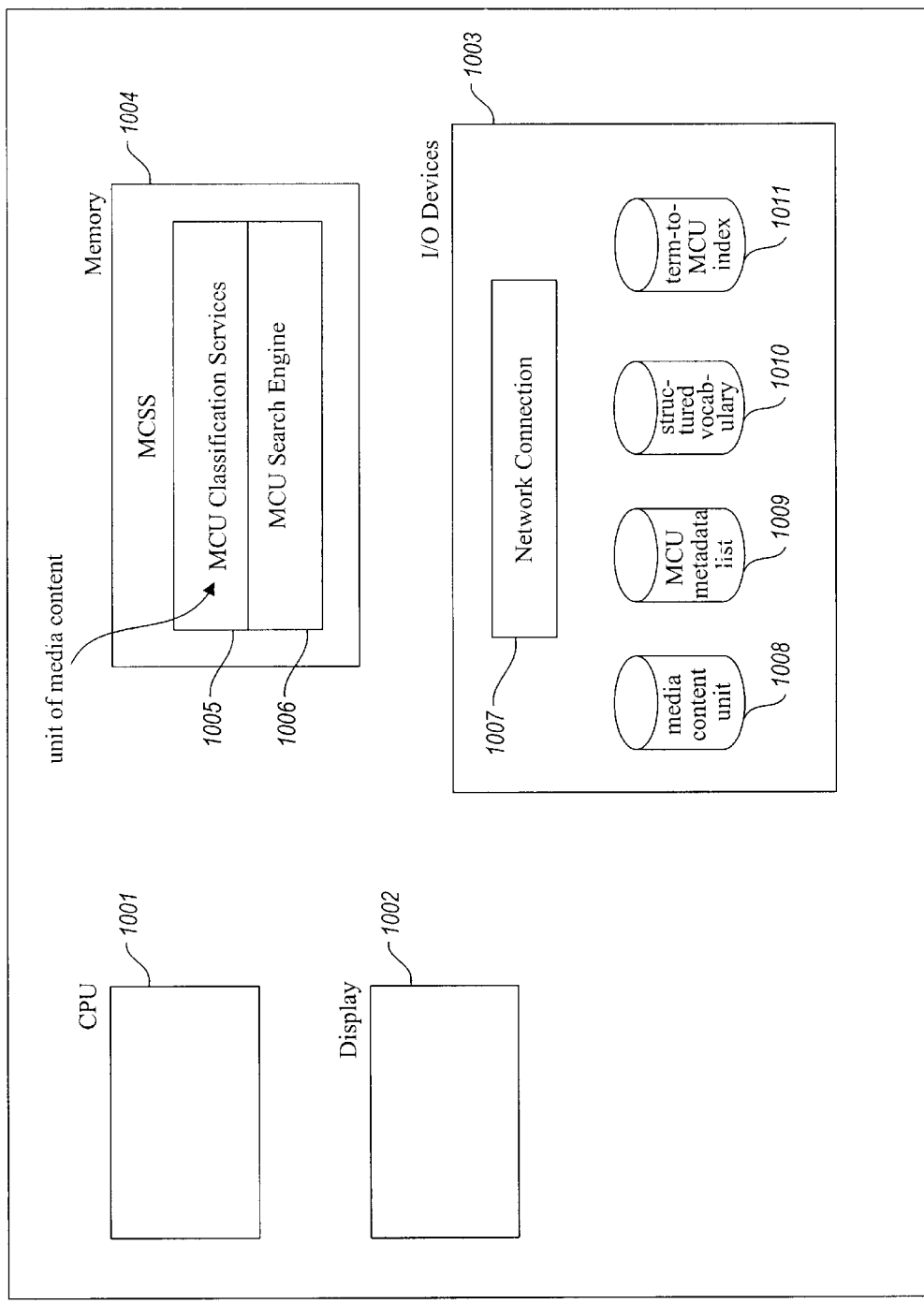
FIG. 10 is a block diagram of a computer system for practicing exemplary embodiments of the media classification and search system.

FIG. 10 is a block diagram of a computer system for practicing exemplary embodiments of the media classification and search system. The computer system 1000 contains a central processing unit (CPU) 1001, a display screen (display) 1002, input/output devices 1003, and a computer memory (memory) 1004. The routines for implementing the MCU Classification Services 1005 and the MCU Search Engine 1006 of the MCSS, as well as the operating system code for hosting the MCSS routines, reside in the memory 1002 and execute on at least one CPU, such as the CPU 1001. The operating system code also controls the initialization and maintenance of the various network connections. The input/output devices 1003 are shown containing a network connection 1007 and a storage device for the data repositories containing the Media Content Unit Collection 1008, MCU Metadata Collection 1009, the Structured Vocabulary 1010, and the Term-to-MCU Index 1011. One skilled in the art will recognize that the data repositories of the MCSS may reside on or across multiple, even heterogeneous storage devices.

The network connection 1007 demonstrates that example embodiments operate in an environment where the computer system is connected to one or more networks, remote or local. One skilled in the art will recognize that the methods and systems of the present invention may be practiced on processing systems with varying architectures, including multi-processor environments, and on systems with hard wired logic. Also, one skilled in the art will realize that the present invention can be implemented in a stand-alone environment having no network access.

Figure 11:
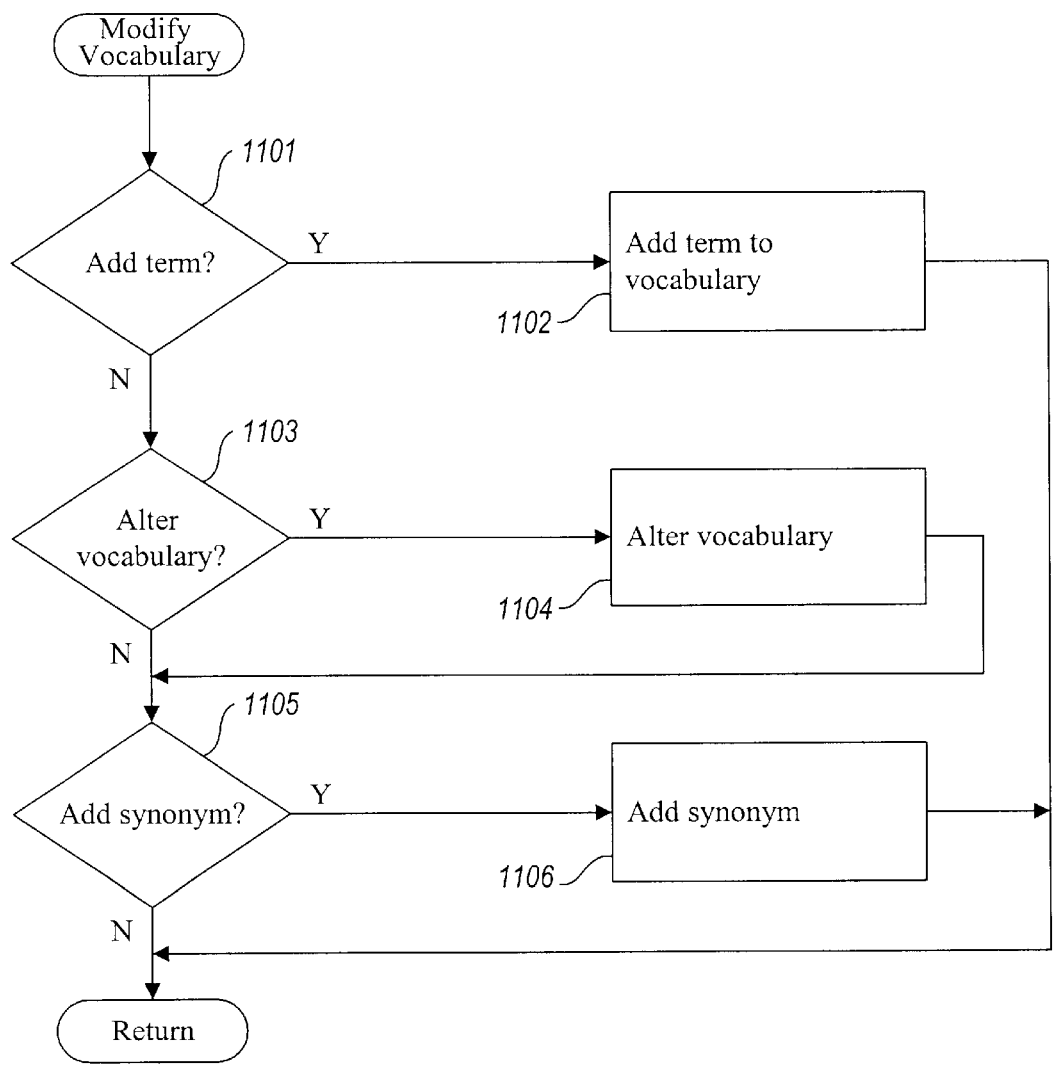
FIG. 11 is an example flow diagram of the Modify Vocabulary routine used to create and maintain the structured vocabulary data repository.

FIG. 11 is an example flow diagram of the Modify Vocabulary routine used to create and maintain the structured vocabulary data repository. The Modify Vocabulary routine takes as input a new descriptive term or sufficient information to modify an existing term. The vocabulary data repository may be modified, for example, in steps 1101 through 1106 by adding a vocabulary unit containing the new descriptive term (in the default language or other supported languages); by changing the order or hierarchy of vocabulary units within the vocabulary data repository, or by adding a synonym to one of the synonym lists in any of the supported languages. The vocabulary data repository is manipulated by routines that add, delete, modify and move nodes within the vocabulary's data structure. The editing process is accomplished by routines that preferably provide visual indications of the parent-child relationships of a set of nodes. It also preferably supports viewing the vocabulary structure from each supported language; thus, supporting translators' needs to toggle between source and target languages.

In one embodiment, vocabulary modifications can be initiated in response to difficulties detected with a particular vocabulary unit. Nodes can also be deleted if no media content units refer to them. It may be also necessary to move nodes in response to newly considered methodology. For example, the node that corresponds to the term "surprise" might move from the node that corresponds to the term "facial expressions" to the node that corresponds to the term "emotions." Typically, nodes are split and their meaning sub-divided into two subclassifications, which leads to nodes having new parents. Note, that the capability to move nodes in this manner allows for the dynamic reclassification of media content simply by altering the vocabulary— without having to reevaluate or reclassify the media content itself. For example, in the sample vocabulary of FIG. 3, "hunting dog" may have been inserted as an intermediate node at some point after "golden retriever" was defined as a child of "dog," after it was realized that non-hunting dogs existed. Any media content units that were already classified before this change to the vocabulary still have valid classifications.

In particular, in step 1101, the Modify Vocabulary routine determines whether the designated descriptive term should be added to the vocabulary system and, if so, continues in step 1102, else continues in step 1103. In step 1102, the routine adds the descriptive term to the vocabulary system by creating a vocabulary unit (that contains the descriptive term) as a node within the hierarchy of the vocabulary data repository, and returns. In step 1103, the routine determines whether the order or hierarchy of vocabulary units within the vocabulary system needs to be changed and, if so, continues in step 1104, else continues in step 1105. In step 1104, the routine proceeds to reorder or change the hierarchy of vocabulary units within the vocabulary system, and continues in step 1105. In an example embodiment, the routine determines whether the vocabulary needs to be altered based upon operator indication (for example, a visual indicator in a user interface). In this case, sufficient information is passed to the routine to indicate the specific changes desired (e.g., old parent-child designation and new parent-child designation). In step 1105, the routine determines whether the descriptive term should be added to the vocabulary system as a synonym and, if so, continues in step 1106, else returns. In step 1106, the routine appends the descriptive term as a synonym to the synonym list of the designated language, and returns. As discussed above, a synonym list of a selected language within a vocabulary unit is assumed to contain at least one descriptive term and any number of appended synonyms.

One skilled in the art will recognize that other implementations and variations of the Modify Vocabulary routine and other example routines provided by the MCSS are possible. For example, the ordering of various steps could be modified, parameters changed, and other changes to the implementation could be made to achieve the described functionality of these routines. For example, the addition of the descriptive terms in steps 1101 and 1102 could be placed after the addition of the synonyms in steps 1105 and 1106.

Figure 12:
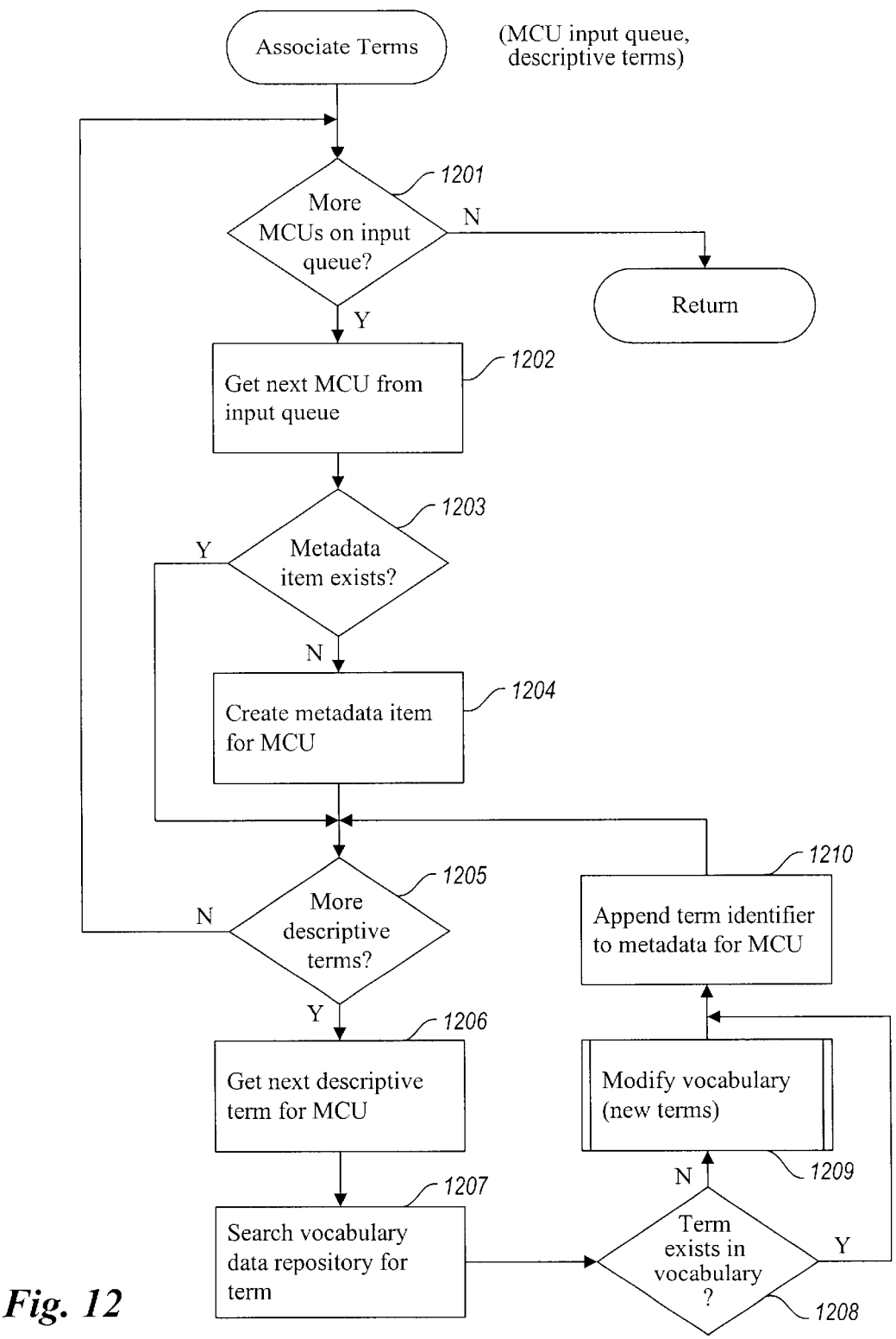
FIG. 12 is an example flow diagram of the Associate Terms routine of the MCU classification services.

FIG. 12 is an example flow diagram of the Associate Terms routine of the MCU classification services. The Associate Terms routine associates one or more descriptive terms with a media content unit so that these terms can be subsequently used to search for and retrieve that MCU upon request. The routine takes as input a queue of MCUs to process and one or more designated descriptive terms for each MCU on the queue. For each designated descriptive term for a particular MCU, the routine determines first whether the term already exists in the vocabulary, and, if not, invokes the Modify Vocabulary routine (discussed with reference to FIG. 11) to add the term first to the structured vocabulary data repository, and then adds the term to the metadata unit associated with that particular MCU. If the new term to be added to the vocabulary has a meaning that is close to a term already in the structured vocabulary, then the word may be appended to the synonym list of the vocabulary unit of the preferred term.

Specifically, in step 1201 the routine determines if there are more MCUs on the input queue to process and, if so, continues in step 1202, else returns. In step 1202, the routine obtains the next MCU from the input queue. In step 1203, the routine determines if a metadata unit for that MCU already exists and, if so, continues in step 1205, else continues in step 1204. In step 1204, the routine creates a new metadata unit for the MCU. In step 1205, the routine determines if there are more descriptive terms designated for the MCU and, if so, continues in step 1206, else continues in step 1201. In one embodiment, descriptive terms may be provided by evaluative routines that apply heuristics to the MCU to extract descriptive terms that characterize the contents of the MCU. For example, evaluative processes that look at the color components of an image to determine its content may be used in conjunction with the present invention. In step 1206, the routine obtains the next designated descriptive term for the MCU. In step 1207, the routine searches the structured vocabulary data repository for the descriptive term. The search examines the preferred term and synonym list of every vocabulary unit to potentially locate the designated term. In one embodiment, the list is preferably ordered or indexed so as to provide for rapid searching of desired terms. For example, hashing techniques or other indexing techniques may be used in conjunction with the vocabulary to improve search time. In step 1208, if the designated term exists in the vocabulary data repository, then the routine continues in step 1209, else continues in step 1210. In step 1209, the routine invokes the Modify Vocabulary routine to modify the vocabulary to add new terms as discussed with reference to FIG. 11. In step 1210, the routine appends the term identifier for the designated term to the metadata unit that corresponds to the current MCU, and continues to the beginning of the term processing loop in step 1205.

Figure 13:
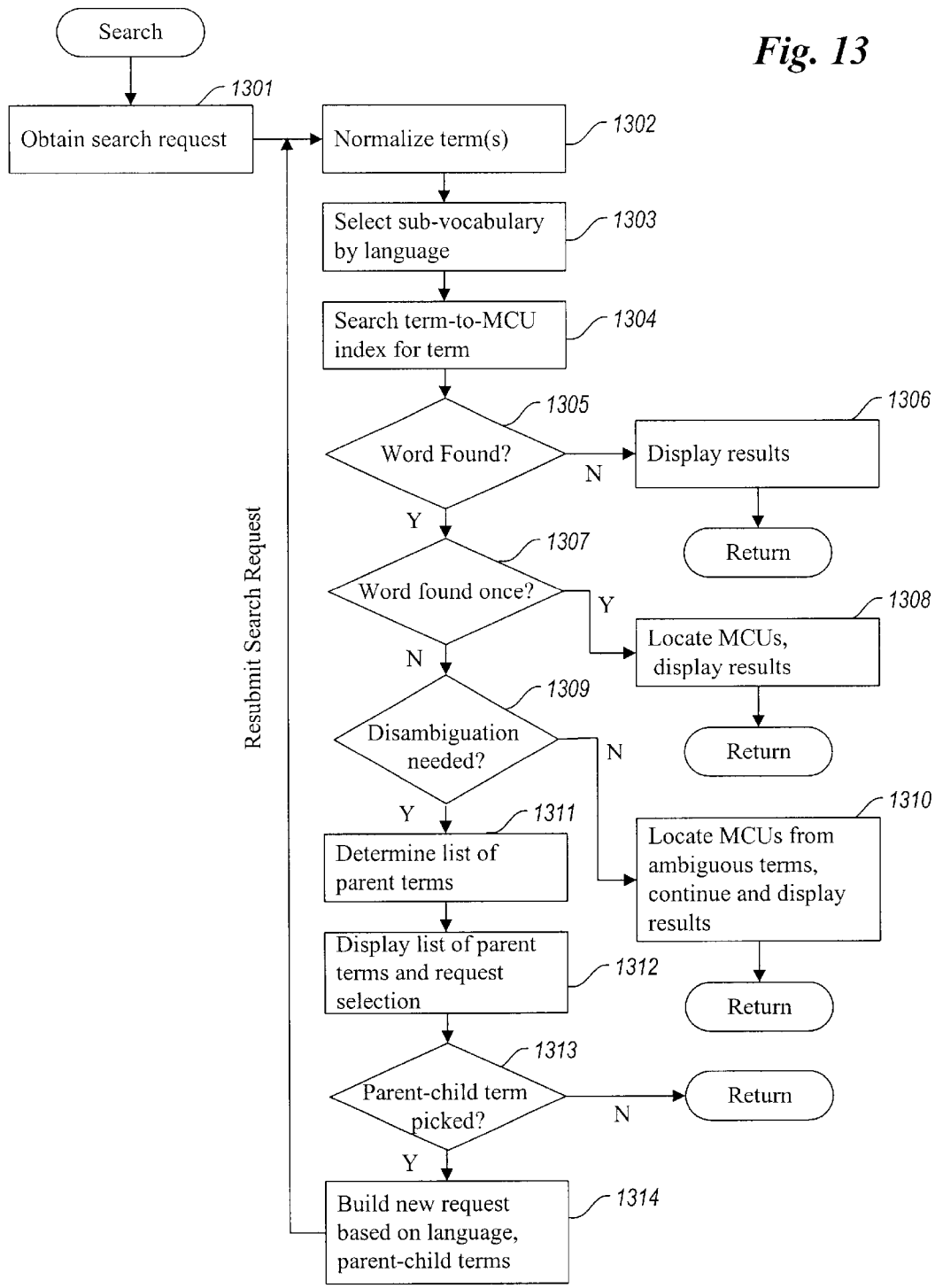
FIG. 13 is an example flow diagram of the Search routine of the MCU Search services.

FIG. 13 is an example flow diagram of the Search routine of the MCU Search services. The Search routine accepts an input request containing search terms, processes the terms, locates media content units associated with the terms, and returns the results. The input request, which contains search terms which are optionally connected by Boolean operators, is received and initially processed. In the case where the input request contains search terms connected by Boolean operators, multiple searches are performed according to the following steps and the results processed in accordance with the supplied Boolean operators, using well-known methods in the art. The search terms of the input request are first normalized to reduce any potential disparities with the stored vocabulary by, for example, making the terms all lower case, removing punctuation, changing plural words to singular words and collapsing any duplicate spaces between the supplied search terms. The supplied search terms must be normalized according to the same rules by which the terms in the vocabulary data repository were normalized when stored. In one embodiment, determining which language is used for the supplied search terms is accomplished by examining a web page location from where the request was made. In another embodiment, the language is specified in the search request. One skilled in the art will recognize that other methods for designating a language are possible. The search routine searches the data repositories to locate all media content units that match the supplied search terms. As discussed above with respect to FIG. 4, the vocabulary contains synonym lists in various languages so that all terms of a selected language form a sub-vocabulary. During a search, the sub-vocabulary is searched for any occurrences of the normalized term, either as a preferred term or a synonym. Following the locating of the matching media content units, either the media content units or a list of the matching results are then typically presented.

If the term occurs multiple times in a sub-vocabulary, then the term is an ambiguous term, as discussed earlier. An example embodiment provides for the ability to selectively disambiguate the request by traversing the hierarchy of the sub-vocabulary, collecting the associated pairing terms, and providing a list of the ambiguous terms as parent-child term pairs, as discussed below with respect to FIG. 14. When an ambiguous request occurs and the disambiguation capability is not in force, then the results of all matches found in the term-to-MCU index are combined and presented. A parent-child term pair can be selected then from the presented list and used to form a new search request. Boolean logic also may be used to further refine the search request so that each component of the Boolean expression can be disambiguated.

Specifically, in step 1301, the routine obtains the search request. In step 1302, the terms of the search request are normalized. Normalization comprises changing the text of the search request according to certain rules so that the terms will more closely match the terms stored in the data repositories. In step 1303, a sub-vocabulary is selected according to the language of the request. In step 1304, the routine searches the term-to-MCU index for the requested search term. The sub-vocabulary of the vocabulary data repository is first searched for any occurrences of the normalized term, either as a preferred term or a synonym. If a match occurs, the term identifier to which the normalized term matches will be used to reference the term-to-MCU index to very rapidly locate corresponding MCUs. In step 1305, the routine determines if the word used as the search term is present in the index and, if so, continues in step 1307, else continues in step 1306. In step 1306, the routine displays the results of the search, and returns. As described below with reference to FIG. 15, in one embodiment the search results may also include the MCUs that are associated with subordinate terminal identifiers. This allows, for example, MCUs associated with more specific terms of the genus to be included as well. For example, MCUs associated with the terms "sheepdog" and "hunting dog" are located as well when the term "dog" is used as a search term. (See example vocabulary discussed with reference to FIG. 3.) In step 1307, the routine determines whether the word used as the search term was found only once and, if so, continues in step 1308, else continues in step 1309. If a word used as a search term is found only once in the term-to-MCU index, the word does not have more than one meaning with respect to the structured vocabulary (i.e., it is not ambiguous) and thus does not need to be disambiguated. In step 1308, the routine determines which MCUs correspond to the search term, displays the results, and returns. As stated, the routine may list only the MCUs referenced by a particular term, or may optionally refer to subordinate terms of the particular terms in the vocabulary data repository to find additional MCUs. For example, a request for "dog" (from the example vocabulary of FIG. 3) would return the list of MCUs corresponding to the term "dog" as well as MCUs corresponding to "sheepdogs," "hunting dogs," "golden retriever," and "yellow labrador." In step 1309, the routine determines if disambiguation is needed and, if so, continues in step 1311, else continues in step 1310. In step 1310, the routine locates MCUs from the ambiguous terms, combines and displays the results, and then returns. In step 1311, the list of parent terms of the ambiguous terms is determined. In step 1312, the list of possible meanings of the ambiguous terms (based on parent-child pairs) is displayed for selection. In step 1313, the routine determines if one of the displayed meanings (parent-child pairs) has been selected and, if so, continues in step 1314, else returns. In step 1314, the routine builds a new search request based upon the designated language and the selected meaning of the ambiguous term, and continues to the beginning of the loop in step 1302.

After a search term has been normalized, the structured vocabulary is examined to obtain the term identifier for a given instance of a search term. If the search routine encounters more than one instance of the given search term in the structured vocabulary, then there are multiple term identifiers located that have potentially different meanings. In order to determine the intent of the search request, the search term must be disambiguated by selecting one of the meanings of the instances found in the structured vocabulary.

FIG. 14 is an example screen display of a dialog used to disambiguate search terms. The screen display example shows five different meanings of the word "bow." For example, "bow" can mean "decorative knot," "a device used to shoot arrows," "the leading portion of a ship," "a courteous movement," or "a device used to play a violin." The user interface allows selection of a particular meaning of the ambiguous term "bow." The selected meaning of the ambiguous term is used to form a new search request that will provide a narrower set of search results.

Figure 15:
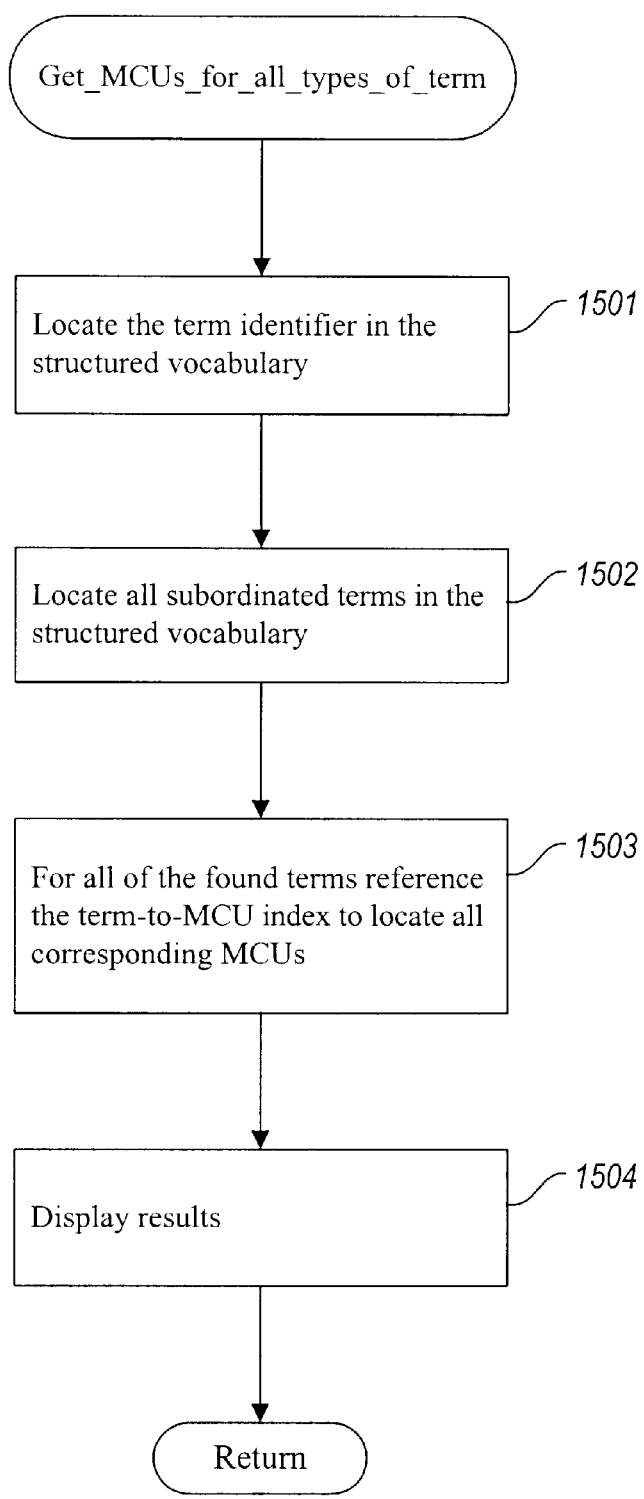
FIG. 15 is an example flow diagram of a routine that locates all of the MCUs that are associated with a particular term identifier and all of its subordinate term identifiers.

FIG. 15 is an example flow diagram of a routine that locates all of the MCUs that are associated with a particular term identifier and all of its subordinate term identifiers. It takes as input a search term that has been normalized. In step 1501, the designated term identifier is located in the structured vocabulary. In step 1502, all of the subordinated terms of the term identifier are determined by traversing the structured vocabulary. The structured vocabulary is traversed by visiting all subordinate vocabulary units as described with reference to FIG. 5. In step 1503, all of the determined terms are used to search the term-to-MCU index, which locates all corresponding MCUs. In step 1504, the routine displays the located MCUs, and returns.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to other types of media than images, including units of sound and text. In addition, the teachings may be applied to other types of systems, including turnkey systems and media classification systems embedded in other devices. These and other changes may be made to the invention in light of the above detailed description. Accordingly, the invention is not limited by the disclosure, but instead the scope of the present invention is to be determined by the following claims.

What is claimed is:

1. A method in a computer system for classifying and locating a plurality of media content units using a structured vocabulary stored in a data repository, the structured vocabulary having a plurality of terms ordered such that the relationship of each term to each other term is inherent in the ordering, comprising:

for each media content unit,
   determining a term within the structured vocabulary that represents a characteristic of the media content unit; and
   associating an identifier of the determined term with the media content unit so that the media content unit is characterized by the determined term;
receiving a request to locate a media content unit based upon a search term; and
using the structured vocabulary to determine a collection of media content units that are characterized by the search term.

2. The method of claim 1, further comprising modifying the ordering of one of the determined terms within the structured vocabulary so that its relationship to other terms is altered, the modification occurring in a manner that does not affect prior associations between the one term and a media content unit.

3. The method of claim 1 wherein the ordering is hierarchical such that terms located further down in the hierarchy provide more specificity.

4. The method of claim 1 wherein the ordering includes terms that are subordinated to a plurality of other terms.

5. The method of claim 1 wherein the determining of a term and the associating of an identifier of the determined term with a media content unit reflects an objective classification of the media content unit.

6. The method of claim 1 wherein the determining of a term and the associating of an identifier of the determined term with a media content unit reflects a subjective classification of the media content unit.

7. The method of claim 1 wherein the search term that is used to locate a media content unit is specified in a language other than the language of a determined term of the structured vocabulary that was used to characterize the media content unit.

8. The method of claim 1 wherein a term is ordered by implicitly associating the term with a plurality of other terms.

9. The method of claim 1 wherein the search term is normalized to convert search term variants to a same search term.

10. The method of claim 1 wherein the structured vocabulary comprises terms in a second language that correspond to terms expressed in a first language of the structured vocabulary.

11. The method of claim 10 wherein the association of the identifier of a term in the first language with a media content unit results in the media content unit being automatically characterized by the corresponding term in the second language.

12. The method of claim 1 wherein ambiguous search terms are disambiguated by presenting the relationship of the search term to a plurality of other terms.

13. The method of claim 12 wherein the disambiguation of search terms may be optionally activated.

14. The method of claim 12 wherein the disambiguated search term is used to locate media content units that are characterized by the disambiguated search term.

15. The method of claim 1, further comprising, for each term of the structured vocabulary, creating an index from the term to a collection of media content units that are characterized by the term.

16. The method of claim 15, further comprising using the created index to efficiently determine the collection of media content units that are characterized by the search term.

17. The method of claim 1 wherein the media content units comprise digital images.

18. The method of claim 1 wherein the media content units comprise sound recordings.

19. The method of claim 1 wherein the media content units comprise text.

20. A structured vocabulary stored in a computer memory usable with a computer system, comprising:
   a plurality of media content units; and
   a plurality of identifiers of terms, wherein the terms are ordered in the structured vocabulary according to inherent relationships between the terms, such that each media content unit is associated with an identifier of at least one term, and wherein each media content unit can be determined by matching a requested term with an identifier of a corresponding term.

21. The structured vocabulary of claim 20 wherein each term is stored in a vocabulary unit.

22. The structured vocabulary of claim 21 wherein the vocabulary unit stores synonyms of the term stored in the vocabulary unit.

23. The structured vocabulary of claim 20, wherein each identifier of a term also identifies synonyms of that term.

24. The structured vocabulary of claim 23, wherein a synonym includes a translation of the term into another language.

25. The structured vocabulary of claim 20 wherein each term is associated with a particular media content unit by storing an identifier of the term in a metadata structure associated with the media content unit.

26. The structured vocabulary of claim 25 wherein the metadata structure is used to determine the media content unit when a request term is received by the computer system that specifies the term referred to by the metadata structure.

27. The structured vocabulary of claim 20, further comprising a reverse index stored in the computer memory that stores, for each term, an identifier of each media content unit that is associated with the identifier of that term.

28. The structured vocabulary of claim 27 wherein the reverse index is used to efficiently determine a set of media content units associated with a requested term.

29. The structured vocabulary of claim 20 wherein the plurality of terms comprises terms in a plurality of languages.

30. The structured vocabulary of claim 29 wherein two term in different languages that share a common meaning can be used interchangeably to locate a media content unit associated with the identifier of one of the two terms.

31. The structured vocabulary of claim 20 wherein the media content units comprise digital images.

32. The structured vocabulary of claim 20 wherein the media content units comprise sound recordings.

33. The structured vocabulary of claim 20 wherein the media content units comprise text.

34. A media classification and retrieval system comprising:
   a structured vocabulary stored in a data repository and having a plurality of terms ordered such that the relationship of each term to each other term is inherent in the ordering;
   a plurality of media content units wherein each media content unit is associated with an identifier of a term of the structure vocabulary that represents a characteristic of the media content unit; and
   a search engine that receives a request to locate a media content unit based upon a search term and that uses the structured vocabulary and the associations between media content units and identifiers of terms in the structured vocabulary to determine a collection of media content units that are characterized by the search term.

35. The system of claim 34 wherein the ordering of one of the terms that represents a characteristic of a media content unit is modified so that its relationship to other terms is altered, the modification occurring in a manner that does not affect prior associations between the one term and a media content unit.

36. The system of claim 34 wherein the ordering of the terms of the structured vocabulary is hierarchical such that terms located further down in the hierarchy provide more specificity.

37. The system of claim 34 wherein the ordering of the terms of the structured vocabulary includes terms that are subordinated to a plurality of other terms.

38. The system of claim 34 wherein a term and an identifier of the term are associated with a media content unit according to an objective classification.

39. The system of claim 34 wherein a term and an identifier of the term are associated with the media content unit according to a subjective classification.

40. The system of claim 34 wherein the search engine accepts a search term that is specified in a language other than the language of the term of the structured vocabulary whose identifier was associated with the media content unit.

41. The system of claim 34 wherein a term is ordered by implicitly associating the term with a plurality of other terms.

42. The system of claim 34 wherein the search engine normalizes the search term to convert search term variances to a same search term.

43. The system of claim 34 wherein the structured vocabulary comprises terms in a second language that correspond to terms expressed in a first language of the structured vocabulary.

44. The system of claim 43 wherein the association of an identifier of a term in the first language with a media content unit results in the media content unit being automatically characterized by a corresponding term in the second language.

45. The system of claim 34 wherein the search engine disambiguates ambiguous search terms by presenting the relationship of the search term to a plurality of other terms.

46. The system of claim 45 wherein the search engine may optionally activate the disambiguation of search terms.

47. The system of claim 45 wherein the disambiguated search term is used to locate media content units.

48. The system of claim 34, further comprising an index that associates a collection of media content units with a term that characterizes each of the media content units of the collection.

49. The system of claim 48 wherein the search engine uses the index to efficiently determine the collection of media content units that are characterized by the search term.

50. The system of claim 34 wherein the media content units comprise digital images.

51. The system of claim 34 wherein the media content units comprise sound recordings.

52. The system of claim 34 wherein the media content units comprise text.

53. A method in a computer system for reclassifying media content using a structured vocabulary stored in the computer system, the computer system having a plurality of stored media content units that have been each classified according to current terms of the structured vocabulary comprising:

receiving a descriptive term; and based upon the received descriptive term, modifying the structured vocabulary without destroying the relationships of the already classified media content units to current terms of the structured vocabulary.

54. The method of claim 53 wherein modifying the structured vocabulary includes storing an identifier of the descriptive term in the structured vocabulary and whereby the location of the stored identifier in the structured vocabulary indicates the relationship of the descriptive term to other terms in the vocabulary.

55. The method of claim 53 wherein modifying the structured vocabulary includes changing the ordering of terms within the structured vocabulary.

56. The method of claim 53 wherein modifying the structured vocabulary includes adding a synonym of an existing term to the structured vocabulary.

57. The method of claim 56 wherein adding the synonym of the existing term adds a term in a second language to the structured vocabulary.

58. The method of claim 53 wherein modifying the structured vocabulary includes deleting a term from the structured vocabulary.

59. The method of claim 53 wherein modifying the structured vocabulary includes deleting a synonym of an existing term from the structured vocabulary.

60. The method of claim 53, further comprising retrieving a collection of media content units based upon a search term.

61. The method of claim 53, further comprising, upon receiving the descriptive term, determining whether the received term is ambiguous.

62. The method of claim 61 wherein the determination of ambiguity is made by examining whether the received term already exists in the structured vocabulary.

63. The method of claim 53 wherein modifying the structured vocabulary includes providing a set of choices that convey multiple meanings for a current ambiguous term thereby allowing the current term to be disambiguated.

64. A media classification system comprising:

a structured vocabulary stored in a data repository having a plurality of terms;

a plurality of media content units stored in a data repository, wherein each media content unit has been classified according to the plurality of terms of the structured vocabulary; and a classification engine that receives a descriptive term and, based upon the received descriptive term, modifies the structured vocabulary without destroying the relationships of the already classified media content units to the plurality of terms of the structured vocabulary.

65. The system of claim 64 wherein the classification engine modifies the structured vocabulary to incorporate the descriptive term by storing an identifier of the descriptive term in the structured vocabulary and whereby the relative location of the stored identifier in the structured vocabulary indicates the relationship of the descriptive term to other terms in the vocabulary.

66. The system of claim 64 wherein the classification engine modifies the structured vocabulary by changing the ordering of terms within the structured vocabulary.

67. The system of claim 64 wherein the classification engine modifies the structured vocabulary by adding a synonym of an existing term to the structured vocabulary.

68. The system of claim 67 wherein the classification engine adds the synonym of the existing term by adding a term in a second language to the structured vocabulary.

69. The system of claim 64 wherein the classification engine modifies the structured vocabulary by deleting a term from the structured vocabulary.

70. The system of claim 64 wherein the classification engine modifies the structured vocabulary by deleting a synonym of an existing term from the structured vocabulary.

71. The system of claim 64, further comprising a retrieval engine that retrieves a collection of media content units by locating a search term in the modified structured vocabulary.

72. A computer-readable memory medium containing instructions for controlling a computer processor to reclassify media content using a structured vocabulary stored in a data repository and using a plurality of media content units stored in a data repository that have been each classified according to a plurality of terms of the structured vocabulary, by:

receiving a descriptive term; and based upon the received descriptive term, modifying the stored structured vocabulary without destroying the relationships of the already classified media content units to the plurality of terms of the structured vocabulary.

73. The computer-readable memory medium of claim 72 wherein modifying the structured vocabulary includes storing an identifier of the descriptive term in the structured vocabulary and whereby the location of the stored identifier in the structured vocabulary indicates the relationship of the descriptive term to other terms in the vocabulary.

74. The computer-readable memory medium of claim 72 wherein modifying the structured vocabulary includes changing the ordering of terms within the structured vocabulary.

75. The computer-readable memory medium of claim 72 wherein modifying the structured vocabulary includes adding a synonym of an existing term to the structured vocabulary.

76. The computer-readable memory medium of claim 75 wherein adding the synonym of the existing term adds a term in a second language to the structured vocabulary.

77. The computer-readable memory medium of claim 72 wherein modifying the structured vocabulary includes deleting a term from the structured vocabulary.

78. The computer-readable memory medium of claim 72 wherein modifying the structured vocabulary includes deleting a synonym of an existing term from the structured vocabulary.

79. The computer-readable memory medium of claim 72 further comprising instructions that control a computer processor to retrieve a collection of media content units based upon a search term.

80. A method in a first computer system for retrieving a media content unit from a second computer system having a plurality of media content units that have been classified according to terms of a structured vocabulary, wherein the terms are ordered such that the relationship of each term to each other term is inherent in the ordering, comprising:

sending a request for a media content unit, the request specifying a search term; and receiving an indication of a media content unit that corresponds to the specified search term, wherein the search term is located within the structured vocabulary and is used to determine a media content unit that corresponds to the search term.

81. The method of claim 50, wherein the search term is different from the term used to classify the indicated media content unit.

82. The method of claim 81 wherein the term used to classify the indicated media content unit is of a language different than the search term.

83. The method of claim 80, further comprising:

receiving from the second computer system an indication of multiple instances of the search term in the structured vocabulary; and sending to the second computer system a revised request that specifies one of the multiple instance of the search term.

84. The method of claim 80 wherein the received media content unit is a digital image.

85. The method of claim 80 wherein the received media content unit is a sound recording.

86. The method of claim 80 wherein the received media content unit is a text record.

87. The method of claim 80 wherein the first and second computer system are the same computer system.

88. The method of claim 80 wherein the first and second computer systems are physically distinct.

89. A method in a computer system for rapidly locating a plurality of media content units that have been classified using a plurality of ordered terms in a structured vocabulary by associating each media content unit with at least one of the ordered terms, the terms ordered such that the relationship of each term to each other term is inherent in the ordering, the computer system having a reverse index that indexes the media content units by each associated term, comprising:

receiving a request to locate a media content unit using a search term; and using the search term as an index into the reverse index to locate the media content units associated by the search term.

90. The method of claim 89 wherein the terms of the structured vocabulary are ordered in a hierarchical fashion.

91. The method of claim 89 wherein each media content unit has a corresponding metadata structure and wherein a reference to each of the ordered terms of the structured vocabulary that is associated with the media content unit is stored in the metadata structure corresponding to the associated media content unit.

92. The method of claim 91 wherein the metadata structures are used to construct the reverse index.

93. The method of claim 89 wherein the search term is normalized to reduce variations of the different search terms to a same term.

94. The method of claim 89 wherein the media content units comprise digital images.

95. The method of claim 89 wherein the media content units comprise sound recordings.

96. The method of claim 89 wherein the media content units comprise text.

97. A media content retrieval system comprising:

a structured vocabulary stored in a data repository and having a plurality of terms ordered such that the relationship of each term to each other term is inherent in the ordering;

a plurality of media content units stored in a data repository, wherein each media content unit has been classified by associating an identifier of a descriptive term with the media content unit; and a search engine having a reverse index that indexes the media content units by terms, the search engine being configured to receive a request to locate a media content unit using a search term and being configured to use the search term as an index into the reverse index to locate the media content units associated with an identifier of the search term.

98. The system of claim 97 wherein the terms of the structured vocabulary are ordered in a hierarchical fashion.

99. The system of claim 97 wherein each media content unit has a corresponding metadata structure and wherein a reference to each of the ordered terms of the structured vocabulary that is associated with the media content unit is stored in the corresponding metadata structure corresponding to the associated media content unit.

100. The system of claim 99 wherein the metadata structures are used to construct the reverse index.

101. The system of claim 99 wherein each metadata structure contains data in addition to a reference to a term in the structured vocabulary.

102. The system of claim 97 wherein the search term is normalized to a canonical form.

103. The system of claim 97 wherein the media content unit comprises digital images.

104. The system of claim 97 wherein the media content units comprise sound recordings.

105. The system of claim 97 wherein the media content units comprise text.

106. The system of claim 97 wherein the reverse index indexes a particular media content unit by a general term in addition to indexing the particular media content unit by a term that indicates a more specific meaning of the general term.

107. A computer-readable memory medium containing instructions for controlling a computer processor of a computer system to efficiently retrieve media content that has been classified using a plurality of ordered terms in a structured vocabulary by associating each media content unit with at least one of the ordered terms, the computer system having a reverse index that indexes the media content units by each associated term, by:

receiving a request to locate a media content unit using a search term; and using the search term as an index into the reverse index to locate the media content units associated by the search term.

108. The computer-readable memory medium of claim 107 wherein the terms of the structured vocabulary are ordered in a hierarchical fashion.

109. The computer-readable memory medium of claim 107 wherein each media content unit has a corresponding metadata structure and wherein a reference to each of the ordered terms of the structured vocabulary that is associated with the media content unit is stored in the metadata structure corresponding to the associated media content unit.

110. The computer-readable memory medium of claim 109 wherein the metadata structures are used to construct the reverse index.

111. The computer-readable memory medium of claim 107 wherein the search term is normalized.

112. The computer-readable memory medium of claim 107 wherein the media content units comprise digital images.

113. The computer-readable memory medium of claim 107 wherein the media content units comprise sound recordings.

114. The computer-readable memory medium of claim 107 wherein the media content units comprise text.

* * * * *

UNITED STATES PATENT AND TRADEMARK OFFICE
CERTIFICATE OF CORRECTION

PATENT NO. : 6,735,583 B1
DATED : May 11, 2004
INVENTOR(S) : Anna Bjarnestam et al.

It is certified that error appears in the above-identified patent and that said Letters Patent is hereby corrected as shown below:

Column 16,
Line 2, "term" should read -- terms --.
Line 19, "structures" should read -- structured --.
Line 45, "with the media" should read -- with a media --.

Column 19,
Line 18, "claim 50," should read -- claim 80 --.
Line 29, "instance" should read -- instances --.

Signed and Sealed this

Fourteenth Day of February, 2006

JON W. DUDAS
*Director of the United States Patent and Trademark Office*

US006735583C1

(12) EX PARTE REEXAMINATION CERTIFICATE (6124th)
United States Patent
Bjarnestam et al.

(10) Number: US 6,735,583 C1
(45) Certificate Issued: Feb. 19, 2008

(54) METHOD AND SYSTEM FOR CLASSIFYING AND LOCATING MEDIA CONTENT

(75) Inventors: Anna Bjarnestam, Seattle, WA (US); Karina Holm, London (GB); Alan Capel, Buckinghamshire (GB); William G. Kuhn, Seattle, WA (US); Jason Staczek, Seattle, WA (US)

(73) Assignee: Getty Images Limited, London (GB)

Reexamination Request:
No. 90/007,488, Mar. 29, 2005

Reexamination Certificate for:
Patent No.: 6,735,583
Issued: May 11, 2004
Appl. No.: 09/705,513
Filed: Nov. 1, 2000

Certificate of Correction issued Feb. 14, 2006.

(51) Int. Cl.
*G06F 17/30* (2006.01)

(52) U.S. Cl. ............. 707/2; 707/4; 707/5; 707/E17.009
(58) Field of Classification Search ...................... 707/2, 707/4, 5, 80, 1–10, 100–104.1
See application file for complete search history.

(56) References Cited

U.S. PATENT DOCUMENTS

| | | | |
|---|---|---|---|
| 5,109,509 A | 4/1992 | Katayama et al. | |
| 5,337,233 A | 8/1994 | Hofert et al. | |
| 5,469,354 A | 11/1995 | Hatakeyama et al. | |
| 5,619,410 A | 4/1997 | Emori et al. | |
| 5,778,361 A | 7/1998 | Nanjo et al. | |
| 5,963,893 A | 10/1999 | Halstead, Jr. et al. | |
| 6,035,269 A | 3/2000 | Kim | |
| 6,735,583 B1 | 5/2004 | Bjarnestam et al. | 707/2 |

OTHER PUBLICATIONS

Patents on the Internet versus Patents Online: A Snapshot in Time, Nancy Lambert, J. Chem. Inf. Comput. Sci 1999, 39, 448–452.

Manual of Classification, U.S. Department of Commerce: Patent and Trademark Office, Basic Manual Dec. 1990, Revision No. 3, Jun. 30, 1992.

Manual of Classification, U.S. Department of Commerce: Patent and Trademark Office, Basic Manual Dec. 1994, Revision No. 3, Jun. 30, 1996.

U.S. Patent Advanced Search Page, patents.uspto.gov/access/search–adv.html.

IBM Advanced Text Search, www.patents.ibm.com/advquery.

Library of Congress. "Library of Congress Classification Outline—Class N," Cataloging Policy and Support Office, http://www.loc.gov/catdir/cpso/lcco/lcco_n.pdf; Printed on Sep. 18, 2006, pp. 1–9.

Teller, V. et al.: "The Probabilistic Algorithm for Segmenting Non–Kanji Japanese Strings," Proceedings National Conference on Artificial Intelligence, vol. 1, Jul. 31, 1994, pp. 742–747.

Selling Stock. "FPG Launches Web Site Comparing FPG's Site With Those Of Other Agencies," http://www.pickphoto.com/articles/admin–article–view.asp?id=177. Oct. 23, 1998.

*Primary Examiner*—Majid A. Banankhah

(57) ABSTRACT

A computer-based method and system for classifying and locating media content is provided. In preferred embodiments, a dynamically modifiable, structured vocabulary system is used to drive a media classification and search system. An exemplary embodiment of the media classification and search system includes media content unit classification services, a media content unit search engine, and one or more data repositories, including typically a media content unit collection, metadata, the vocabulary, and a term-to-media content reverse index. The structured vocabulary provides a classification system, whose structure and relationships can be altered independently of the media content being classified, thus enabling tuning of the system without needing to reclassify data. The use of the structured vocabulary also increases the rate of success and efficiency in matching search requests to locate media content.

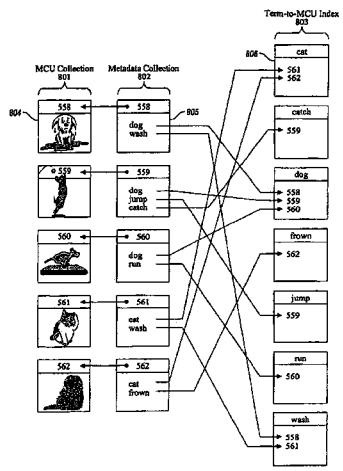

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–79 and 89–114 is confirmed.

Claims 80 and 81 are determined to be patentable as amended.

Claims 82–88, dependent on an amended claim, are determined to be patentable.

New claims 115–131 are added and determined to be patentable.

80. A method in a first computer system for retrieving a media content unit from a second computer system having a plurality of media content units that have been classified according to terms of a structured vocabulary, wherein the terms are ordered such that the relationship of each term to each other term is inherent in the ordering, comprising:
  sending a request for a media content unit, the request specifying a search term; and
  receiving an indication of a media content unit that corresponds to the specified search term, wherein the search term is located within the structured vocabulary and is used to determined a media content unit that corresponds to the search term, *and*
  *wherein the search term is associated with one of a plurality of identifiers of the terms, wherein the terms are ordered in the structured vocabulary according to inherent relationships between the terms, such that each media content unit is associated with an identifier of at least one term, and wherein each media content unit can be determined by matching a requested term with an identifier of a corresponding term.*

81. The method of claim [50] *80*, wherein the search term is different from the term used to classify the indicated media content unit.

*115. A method in a first computer system for retrieving a media content unit from a second computer system having a plurality of media content units that have been classified according to terms of a structured vocabulary, wherein the terms are ordered such that the relationship of each term to each other term is inherent in the ordering, comprising:*
  *sending a request for a media content unit, the request specifying a search term; and*
  *receiving an indication of a media content unit that corresponds to the specified search term, wherein the search term is located within the structured vocabulary and is used to determine a media content unit that corresponds to the search term, and*
  *wherein for each media content unit, a term is determined within the structured vocabulary that represents a characteristic of the media content unit, wherein an identifier of the determined term is associated with the media content unit so that the media content unit is characterized by the determined term, and wherein the structured vocabulary determines a collection of media content units that are characterized by the search term.*

*116. The method of claim 115, wherein the search term is different from the term used to classify the indicated media content unit.*

*117. The method of claim 116 wherein the term used to classify the indicated media content unit is of a language different than the search term.*

*118. The method of claim 115, further comprising: receiving from the second computer system an indication of multiple instances of the search term in the structured vocabulary; and sending to the second computer system a revised request that specifies one of the multiple instance of the search term.*

*119. The method of claim 115 wherein the received media content unit is a digital image.*

*120. The method of claim 115 wherein the received media content unit is a sound recording.*

*121. The method of claim 115 wherein the received media content unit is a text record.*

*122. The method of claim 115 wherein the first and second computer system are the same computer system.*

*123. The method of claim 115 wherein the first and second computer system are physically distinct.*

*124. A method in a first computer system for retrieving a media content unit from a second computer system having a plurality of media content units that have been classified according to terms of a structured vocabulary, wherein the terms are ordered such that the relationship of each term to each other term is inherent in the ordering, comprising:*
  *sending a request for a media content unit, the request specifying a search term;*
  *receiving from the second computer system an indication of multiple instances of the search term in the structured vocabulary;*
  *sending to the second computer system a revised request that specifies one of the multiple instance of the search term; and,*
  *receiving an indication of a media content unit that corresponds to the specified one of the multiple instances of the search term, wherein the specified one of the multiple instances of the search term is located within the structured vocabulary and is used to determine a media content unit that corresponds to the specified one of the multiple instances of the search term.*

*125. The method of claim 124, wherein the search term is different from the term used to classify the indicated media content unit.*

*126. The method of claim 125 wherein the term used to classify the indicated media content unit is of a language different than the search term.*

*127. The method of claim 124 wherein the received media content unit is a digital image.*

*128. The method of claim 124 wherein the received media content unit is a sound recording.*

*129. The method of claim 124 wherein the received media content unit is a text record.*

*130. The method of claim 124 wherein the first and second computer system are the same computer system.*

*131. The method of claim 124 wherein the first and second computer systems are physically distinct.*

\* \* \* \* \*